United States Patent
Morota et al.

(10) Patent No.: US 8,427,850 B2
(45) Date of Patent: Apr. 23, 2013

(54) SWITCHING POWER SUPPLY DEVICE WITH A SWITCHING CONTROL CIRCUIT

(75) Inventors: Naohiko Morota, Hyogo (JP);
Tetsuyuki Fukushima, Hyogo (JP);
Kazuhiro Murata, Hyogo (JP)

(73) Assignee: Panasonic Corporation, Osaka (JP)

( * ) Notice: Subject to any disclaimer, the term of this patent is extended or adjusted under 35 U.S.C. 154(b) by 211 days.

(21) Appl. No.: 13/020,374

(22) Filed: Feb. 3, 2011

(65) Prior Publication Data
US 2011/0194314 A1    Aug. 11, 2011

(30) Foreign Application Priority Data

Feb. 8, 2010   (JP) ................. 2010-025922

(51) Int. Cl.
*H02H 7/122*    (2006.01)
*H02M 3/335*    (2006.01)
(52) U.S. Cl.
USPC ................ 363/56.11; 363/21.1; 363/21.15; 363/21.16
(58) Field of Classification Search .............. 363/21.1, 363/21.15, 21.16, 56.11
See application file for complete search history.

(56) References Cited

U.S. PATENT DOCUMENTS

| | | | |
|---|---|---|---|
| 5,784,231 A | 7/1998 | Majid et al. | |
| 7,215,517 B2 | 5/2007 | Takamatsu | |
| 7,492,615 B2 | 2/2009 | Morota et al. | |
| 2005/0259455 A1 | 11/2005 | Mori | |
| 2007/0103944 A1* | 5/2007 | Mori | 363/21.12 |
| 2008/0117653 A1* | 5/2008 | Saito | 363/20 |
| 2009/0180302 A1* | 7/2009 | Kawabe et al. | 363/21.01 |
| 2009/0257251 A1* | 10/2009 | Su et al. | 363/21.15 |
| 2010/0008109 A1* | 1/2010 | Morota | 363/21.16 |
| 2010/0124081 A1 | 5/2010 | Morota et al. | |
| 2010/0309690 A1* | 12/2010 | Kawabe et al. | 363/21.01 |

FOREIGN PATENT DOCUMENTS

| | | |
|---|---|---|
| JP | 2006-014573 | 1/2006 |
| JP | 3973652 | 6/2007 |
| JP | 2009-165316 | 7/2009 |
| JP | 2010-124572 | 6/2010 |

\* cited by examiner

*Primary Examiner* — Adolf Berhane
*Assistant Examiner* — Gary Nash
(74) *Attorney, Agent, or Firm* — McDermott Will & Emery LLP

(57) ABSTRACT

A switching power supply device including: a power transformer including a primary winding, a secondary winding, and an auxiliary winding; a switching element which is connected to the primary winding; an output voltage generation circuit which converts, into a direct-current voltage, a voltage induced in the secondary winding; a secondary-side on-time signal generation circuit which generates a secondary-side on-time signal indicating a secondary-side on-time; and a switching control circuit which controls a switching operation of the switching element so that the second direct-current voltage falls within a specified range, wherein the switching control circuit controls the switching operation so that the direct-current voltage becomes equal to or below an overvoltage specified value when the secondary-side on-time becomes smaller than a set value.

10 Claims, 14 Drawing Sheets

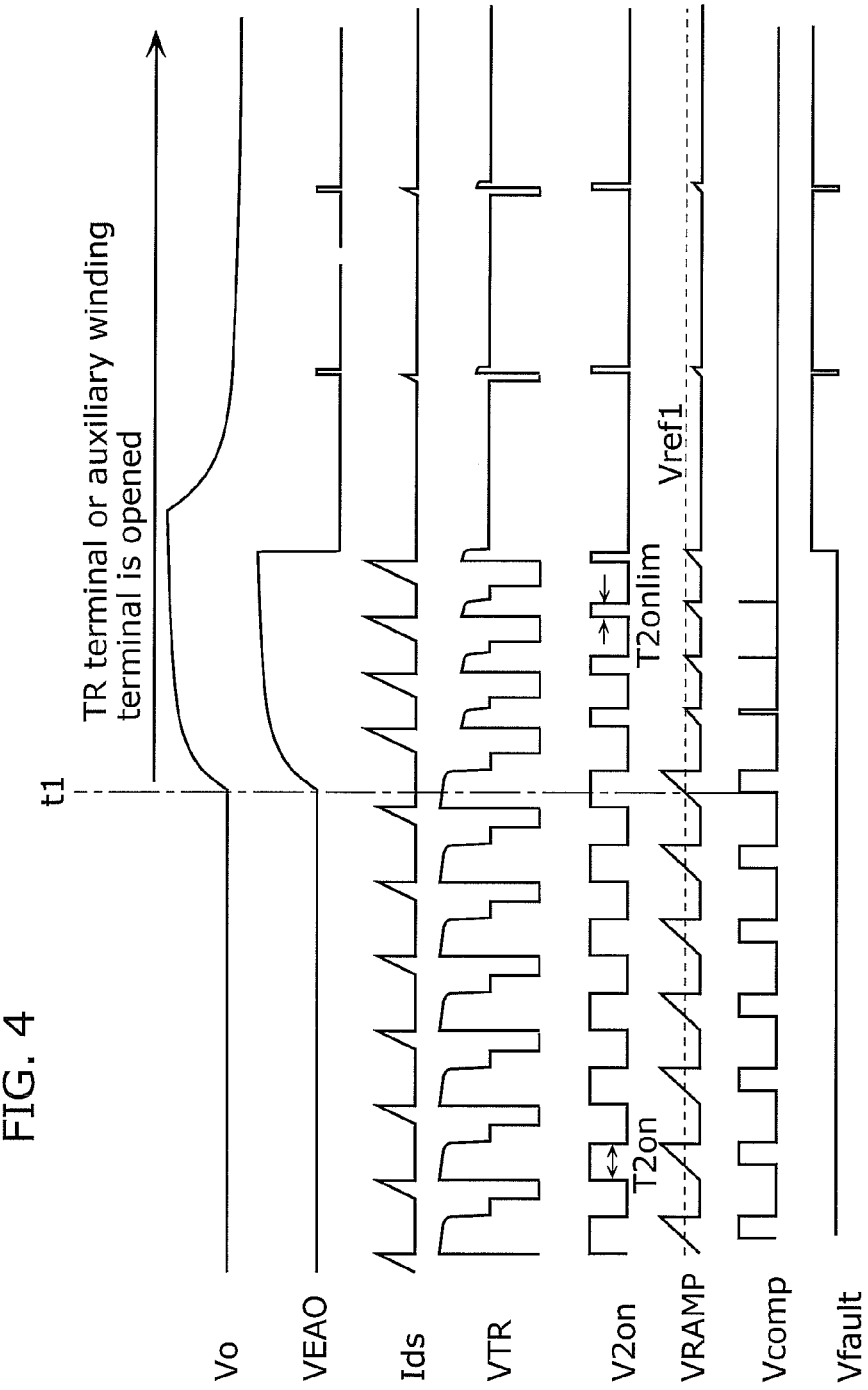

SWITCHING POWER SUPPLY DEVICE WITH A SWITCHING CONTROL CIRCUIT

BACKGROUND OF THE INVENTION (1) Field of the Invention

The present invention relates to a switching power supply device having an overvoltage protecting function.

(2) Description of the Related Art

In conventional switching power supply devices that include a power transformer, it is common to detect an output voltage on the secondary side using a control integrated circuit (IC) or the like provided on the secondary side and to provide feedback of information on the detected secondary-side output voltage to the primary side using a photocoupler.

However, the expensive secondary-side control IC and photocoupler constitute a large part of the cost of the switching power supply device and inhibit miniaturization of the switching power supply device.

In view of such drawbacks, switching power supply devices have been proposed which detect the secondary-side output voltage and control the secondary-side output voltage to be constant on the primary side without using the secondary-side control IC and the photocoupler.

In addition, as described in Japanese Patent Application No. 3973652 (hereinafter referred to as Patent Reference 1), there has been a proposal of a technique for controlling a secondary-side output current to be constant on the primary side without using the photocoupler and so on.

Patent Reference 1 proposes a switching power supply device which performs the following controls in combination by making use of the property of the voltage induced in an auxiliary winding of a transformer to fluctuate according to the secondary-side output voltage: (i) constant voltage control implemented through feedback control using an auxiliary winding, by which the secondary-side output voltage is controlled to be constant and (ii) constant current control implemented through control performed for fixing the on-duty of a secondary current, by which the secondary-side output current is detected from the pulse width of the auxiliary winding voltage waveform and the secondary-side output current is controlled to be constant.

Since such a switching power supply device handles high currents and voltages, various safety standards are in place. Furthermore, many of the power supply manufacturers begin mass production on the condition that the safety is confirmed through their own unique abnormality tests. One of such abnormality tests is a terminal opening test. The terminal opening test allows suppression of a rise in the output voltage even when a control IC, a transformer, or another component is missing or even when poor adhesion occurs. The terminal opening test thus enables a safety check.

SUMMARY OF THE INVENTION

However, with the switching power supply device of Patent Reference 1, in the case of conducting an abnormality test in which a terminal (TR terminal) for detecting the auxiliary winding voltage or a terminal of the auxiliary winding of the transformer is opened, the peak level of the waveform of a TR terminal voltage decreases immediately after the terminal is opened, resulting in provision of a signal with a narrow pulse width.

When the terminal is opened, no signal is provided to the TR terminal in the case of an ideal circuit. However, in some cases, a weak voltage waveform signal is provided to the TR terminal even after the terminal is opened, not only because of the impact of the pattern of the switching power supply device, the arrangement of the circuit elements, and a parasitic element and so on, but also because the TR terminal is a high impedance.

The output voltage rises when the switching power supply device detects such a weak signal and the switching element continues to oscillate. In the conventional techniques, this causes a problem of breaking the switching power supply device or the load on the secondary side. Particularly in the technique of Patent Reference 1, the output voltage rapidly rises because the control is performed so that the frequency increases as the pulse width of a signal provided to the TR terminal diminishes.

As a countermeasure against such a phenomenon, it is effective to, for example, connect a capacitor to the TR terminal to attenuate such a small waveform when the terminal is opened. However, adding the capacitor affects the waveform of the signal provided to the TR terminal during a normal operation, resulting in degradation of the precision of the constant current control and the constant voltage control on the secondary-side output signal.

As another countermeasure, Japanese Unexamined Patent Application Publication No. 2009-165316 (hereinafter referred to as Patent Reference 2) discloses a technique of detecting overvoltage of the secondary-side output voltage using a voltage level of the pulses of the auxiliary winding voltage.

In Patent Reference 2, the switching power supply device employing a quasi-resonant control method monitors the voltage level of the pulses of the auxiliary winding voltage, and causes a protection circuit to operate upon detecting, when the secondary-side output voltage increases, a rise in the voltage level of the pulses of the auxiliary winding voltage.

However, when the TR terminal or a terminal of the auxiliary winding is opened, the voltage level of the pulses of the auxiliary winding voltage decreases immediately after the terminal is opened. Therefore, the technique of Patent Reference 2 does not enable detection of overvoltage of the secondary-side output voltage.

The present invention, conceived in view of the above problems, aims to provide a switching power supply device capable of preventing a break of the load connected to an output terminal on the secondary side and a break of the switching power supply device, which occur when the terminal is opened.

In order to solve the above problems, the switching power supply device according to an aspect of the present invention is a switching power supply device including: a power transformer including a primary winding, a secondary winding, and an auxiliary winding; a switching element which is connected to the primary winding and performs a switching operation to supply and stop supplying a first direct-current voltage to the primary winding; an output voltage generation circuit which converts, into a second direct-current voltage, an alternating-current voltage induced in the secondary winding through the switching operation of the switching element, and supplies the second direct-current voltage to a load; a transformer reset detection circuit which monitors a voltage signal of the auxiliary winding and generates a transformer reset signal according to a decrease in the voltage signal; a secondary-side on-time signal generation circuit which generates a secondary-side on-time signal indicating a secondary-side on-time that is a time period from when the switching element is turned off to when the transformer reset signal is generated; a feedback control circuit which generates a feedback signal corresponding to a voltage level of the second direct-current voltage; a switching control circuit which controls the switching operation of the switching element according to the feedback signal so that the second direct-current voltage falls within a normal operation specified range; and an overvoltage detection circuit which generates an overvoltage detection signal when the secondary-side on-time indicated by the secondary-side on-time signal becomes smaller than a set value, wherein the set value is smaller than the secondary-side on-time resulting when the second direct-current voltage is controlled to be within the normal operation specified range, and the switching control circuit controls the switching operation of the switching element so that the second direct-current voltage becomes equal to or below an overvoltage specified value when the overvoltage detection circuit generates the overvoltage detection signal.

With this configuration, the overvoltage detection circuit detects that the secondary-side on-time has become smaller than the set value upon occurrence of an abnormality that a terminal for detecting a voltage level of the auxiliary winding of the power transformer or a terminal of the auxiliary winding is opened. Upon such detection, the overvoltage detection circuit generates the overvoltage detection signal. When the overvoltage detection signal is generated, the switching control circuit controls the switching operation of the switching element so that the second direct-current voltage becomes equal to or below the overvoltage specified value. This enables the switching power supply device according to this aspect of the present invention to decrease the second direct-current voltage when the terminal is opened. In such a manner, the switching power supply device according to this aspect of the present invention is capable of preventing a break of the load connected to an output terminal on the secondary side or a break of the switching power supply device, which occurs when the terminal is opened.

The set value may be smaller than a minimum secondary-side on-time resulting when the second direct-current voltage is controlled to be within the normal operation specified range.

With this configuration, the switching power supply device according to an aspect of the present invention is capable of preventing erroneous detection by the overvoltage detection circuit during the normal operation.

The set value may be a constant value.

Furthermore, the feedback control circuit may be connected to the auxiliary winding and generate the feedback signal according to a voltage level of the auxiliary winding, the feedback control circuit may include a heavy load detection circuit which generates a heavy load detection signal when the voltage level of the auxiliary winding becomes lower than a heavy load detection voltage which is preset, the overvoltage detection circuit may generate the overvoltage detection signal when the heavy load detection circuit generates the heavy load detection signal and the secondary-side on-time indicated by the secondary-side on-time signal becomes smaller than the set value, and the set value may be smaller than a minimum secondary-side on-time resulting when the voltage level of the auxiliary winding is lower than the heavy load detection voltage.

With this configuration, the overvoltage detection circuit of the switching power supply device according to an aspect of the present invention generates the overvoltage detection signal only when the voltage level of the auxiliary winding is lower than the heavy load detection voltage. This enables the switching power supply device according to this aspect of the present invention to prevent erroneous detection by the overvoltage detection circuit during the normal operation and increase the set value, thus making it possible to detect at an earlier stage that the terminal is opened.

The feedback control circuit may be connected to the auxiliary winding and generate the feedback signal according to a voltage level of the auxiliary winding, the switching control circuit may control the switching operation of the switching element according to an amount of the load using two or more control methods so as to adjust power supplied to the load, the switching control circuit switching among the two or more control methods according to the feedback signal, and the overvoltage detection circuit may change the set value for each of the two or more control methods.

With this configuration, the switching power supply device according to an aspect of the present invention is capable of preventing erroneous detection by the overvoltage detection circuit during the normal operation and increasing the set value, thus making it possible to detect at an earlier stage that the terminal is opened.

The two or more control methods may include: a pulse width modulation (PWM) control method of controlling, according to the feedback signal, a peak value of a current flowing through the switching element so that the second direct-current voltage falls within the normal operation specified range; and a pulse frequency modulation (PFM) control method of controlling a switching frequency of the switching element according to the feedback signal so that the second direct-current voltage falls within the normal operation specified range, the switching control circuit may use the PWM control method when the second direct-current voltage is higher than a first voltage level which is preset, and use the PFM control method when the second direct-current voltage is lower than the first voltage level, and the overvoltage detection circuit may use a first value as the set value when the second direct-current voltage is higher than the first voltage level, and use a second value as the set value when the second direct-current voltage is lower than the first voltage level, the second value being higher than the first value.

Furthermore, the feedback control circuit may be connected to the auxiliary winding and generate the feedback signal according to a voltage level of the auxiliary winding, the switching control circuit may control, according to the feedback signal, a peak value of a current flowing through the switching element so that the second direct-current voltage falls within the normal operation specified range, and the overvoltage detection circuit may increase the set value when the peak value increases.

With this configuration, the switching power supply device according to an aspect of the present invention is capable of preventing erroneous detection by the overvoltage detection circuit during the normal operation and increasing the set value, thus making it possible to detect at an earlier stage that the terminal is opened.

The feedback control circuit may decrease a switching frequency of the switching element when the overvoltage detection circuit generates the overvoltage detection signal.

Furthermore, when the overvoltage detection circuit generates the overvoltage detection signal, the feedback control circuit may decrease a peak value of a current flowing through the switching element.

In addition, when the overvoltage detection circuit generates the overvoltage detection signal, the feedback control circuit may vary the feedback signal in value in a direction in which the feedback signal varies in value when the voltage level of the second direct-current voltage increases, and when the overvoltage detection circuit generates the overvoltage detection signal, the switching control circuit may control the switching operation of the switching element according to the varied feedback signal so that the second direct-current voltage becomes equal to or below the overvoltage specified value.

Note that the present invention can be realized not only as the switching power supply device above but also as a method of controlling a switching power supply device, which includes, as steps, the characteristic elements included in the above switching power supply device, and also as a program causing a computer to execute such characteristic steps. In addition, it is apparent that such a program can be distributed via a recording medium such as a CD-ROM and a transmission medium such as the Internet.

Moreover, the present invention can be realized also as a semiconductor integrated circuit (LSI) that implements some or all of the functions of the switching power supply device above.

As describe above, the present invention provides a switching power supply device capable of preventing a break of the load connected to an output terminal on the secondary side and a break of the switching power supply device, which occur when the terminal is opened.

FURTHER INFORMATION ABOUT TECHNICAL BACKGROUND TO THIS APPLICATION

The disclosure of Japanese Patent Application No. 2010-025922 filed on Feb. 8, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a timing chart of a switching power supply device according to Embodiment 1 of the present invention;

DESCRIPTION OF THE PREFERRED EMBODIMENT(S)

Hereinafter, switching power supply devices illustrating embodiments of the present invention are specifically described with reference to the drawings.

(Embodiment 1)

The switching power supply device according to Embodiment 1 of the present invention detects that a secondary-side on-time has become smaller than a set value upon occurrence of an abnormality that a terminal for detecting a voltage level of an auxiliary winding of a power transformer or a terminal of the auxiliary winding is opened. Upon such detection, the switching power supply device decreases an output voltage. By doing so, the switching power supply device according to Embodiment 1 of the present invention is capable of preventing a break of a load connected to an output terminal on the secondary side and a break of the switching power supply device, which occur when the terminal is opened.

Figure 1:
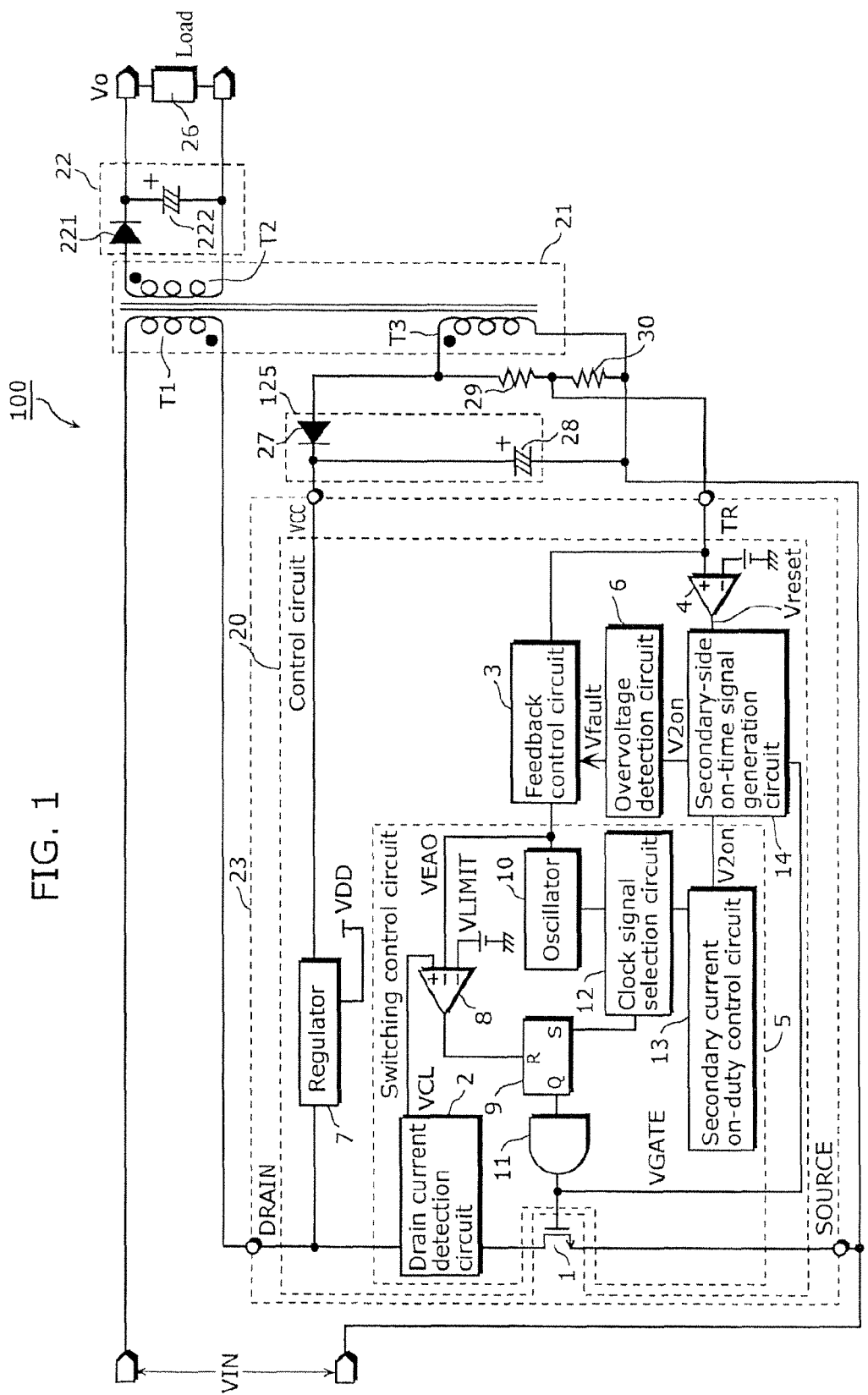
FIG. 1 is a block diagram showing a configuration of a switching power supply device according to Embodiment 1 of the present invention.

FIG. 1 is a block diagram showing a configuration of a switching power supply device 100 according to Embodiment 1 of the present invention.

The switching power supply device 100 according to Embodiment 1 of the present invention includes a semiconductor device 23, a power transformer 21, an output voltage generation circuit 22, a load 26, an auxiliary power generation circuit 125, and resistors 29 and 30. The semiconductor device 23 includes a switching element 1 and a control circuit 20.

As shown in FIG. 1, the power transformer 21 includes a primary winding T1, a secondary winding T2, and an auxiliary winding T3. The secondary winding T2 is opposite to the primary winding T1 in polarity. This means that the switching power supply device 100 is of the flyback type.

The primary winding T1 of the power transformer 21 has one terminal connected to a positive terminal of the switching power supply device 100 on the input side (primary side) and the other terminal connected to a negative terminal of the switching power supply device 100 on the input side (primary side) via the switching element 1 that is a semiconductor device having a high dielectric strength.

The switching element 1 performs a switching operation to supply and stop supplying a direct-current voltage (first direct-current voltage) VIN to the primary winding T1. The switching element 1 includes an input terminal, an output terminal, and a control terminal. The input terminal of the switching element 1 is connected to the primary winding T1, whereas the output terminal is connected to the negative terminal of the switching power supply device 100 on the input side. Furthermore, the switching element 1 performs switching (oscillation) to electrically connect or disconnect the input terminal and the output terminal in response to a control signal VGATE applied to the control terminal. For example, a power MOSFET (Metal-Oxide-Semiconductor Field-Effect Transistor) is used for the switching element 1.

With the switching operation (oscillating operation) of the switching element 1, the direct-current voltage VIN supplied from the terminal of the switching power supply device 100 on the input side to the primary winding T1 is converted into a pulse voltage (high frequency voltage). The obtained pulse voltage is transferred to the secondary winding T2 and the auxiliary winding T3. The auxiliary winding T3 is the same as the secondary winding T2 in polarity. Thus, a pulse voltage Vbias induced in the auxiliary winding T3 is proportional to the pulse voltage induced in the secondary winding T2.

As described, with the switching operation of the switching element 1 connected to the primary winding T1 supplied with the direct-current voltage VIN, a voltage is induced in the secondary winding T2 of the power transformer 21 according to a ratio of the number of turns of the primary winding T1 to the number of turns of the secondary winding T2, whereas a voltage is induced in the auxiliary winding T3 of the power transformer 21 according to a ratio of the number of turns of the primary winding T1 to the number of turns of the auxiliary winding T3.

The secondary winding T2 of the power transformer 21 is connected to the output voltage generation circuit 22. The output voltage generation circuit 22 converts an alternating-current voltage induced in the secondary winding T2 into a secondary-side output voltage (second direct-current voltage) Vo. More specifically, the output voltage generation circuit 22 includes a rectifier diode 221 and a smoothing capacitor 222. The output voltage generation circuit 22 generates the output voltage Vo by rectifying and smoothing, using the rectifier diode 221 and the smoothing capacitor 222, the pulse voltage induced in the secondary winding T2. The output voltage Vo is supplied to the load 26 connected to a terminal of the switching power supply device 100 on the output side (secondary side).

The auxiliary winding T3 of the power transformer 21 is connected to the auxiliary power generation circuit 125. The auxiliary power generation circuit 125 includes a rectifier diode 27 and a smoothing capacitor 28. The auxiliary power generation circuit 125 generates an auxiliary power voltage VCC from the voltage induced in the auxiliary winding T3 and supplies a circuit current of the control circuit 20 from a VCC terminal. Specifically, the auxiliary power generation circuit 125 generates the auxiliary power voltage VCC by rectifying and smoothing, using the rectifier diode 27 and the smoothing capacitor 28, the voltage induced in the auxiliary winding T3.

The semiconductor device 23 is a semiconductor device (semiconductor device for switching power supply) whose components are formed on the same semiconductor substrate. The semiconductor device 23 includes four terminals as external terminals, namely, a DRAIN terminal, a VCC terminal, a TR terminal, and a SOURCE terminal.

The DRAIN terminal is connected to the primary winding T1 of the power transformer 21, and the input terminal of the switching element 1 is connected to the primary winding T1 via the DRAIN terminal.

The VCC terminal is connected to the auxiliary power generation circuit 125 and applied with the auxiliary power voltage VCC. The SOURCE terminal is connected to the negative terminal of the switching power supply device 100 on the input side, and the output terminal of the switching element 1 is connected to the negative terminal of the switching power supply device 100 on the input side via the SOURCE terminal.

The control circuit 20 generates, based on the waveform of a voltage at the TR terminal, the control signal VGATE which is to be applied to the control terminal of the switching element 1, so as to control the switching operation of the switching element 1.

Hereinafter, an inner configuration of the control circuit 20 is described.

The control circuit 20 includes a regulator 7, a switching control circuit 5, a feedback control circuit 3, an overvoltage detection circuit 6, a secondary-side on-time signal generation circuit 14, and a transformer reset detection circuit 4.

The regulator 7 is connected to the VCC terminal and the DRAIN terminal. The regulator 7 supplies a current from either the DRAIN terminal or the VCC terminal to an inner-circuit power supply terminal VDD of the control circuit 20 so as to stabilize a voltage at the inner-circuit power supply terminal VDD at a constant value.

The feedback control circuit 3 generates a feedback signal VEAO corresponding to a voltage level of the output voltage Vo. More specifically, the feedback control circuit 3 is connected to the auxiliary winding T3 via the TR terminal and the resistors 29 and 30 and generates the feedback signal VEAO corresponding to the voltage level of the auxiliary winding T3.

The transformer reset detection circuit 4 monitors a voltage signal of the auxiliary winding T3 and generates a transformer reset pulse signal Vreset according to a decrease in the voltage signal.

Specifically, the transformer reset detection circuit 4 is connected to the TR terminal, and is further connected to the auxiliary winding T3 via the TR terminal and the series resistors 29 and 30.

The transformer reset detection circuit 4 monitors a resistance divided signal obtained by dividing the pulse voltage Vbias which is induced in the auxiliary winding T3 and is provided to the TR terminal. The transformer reset detection circuit 4 detects a decrease, to approximately zero, of a secondary-side current Isec flowing through the secondary winding T2, after the switching element 1 is turned off, that is, the transformer reset detection circuit 4 detects a decrease in the pulse voltage Vbias induced in the auxiliary winding T3. Furthermore, the transformer reset detection circuit 4 generates the transformer reset pulse signal Vreset indicating that the decrease in the pulse voltage Vbias has been detected.

Note that the present invention can use any one of the following methods for detecting the decrease in the pulse voltage Vbias induced in the auxiliary winding T3: a method of detecting, using a comparator as shown as the transformer reset detection circuit 4 of FIG. 1, a time when the pulse voltage Vbias induced in the auxiliary winding T3 becomes lower than a threshold; and a method of detecting, using a differentiating circuit, a time point at which the gradient of the pulse voltage Vbias induced in the auxiliary winding T3 changes.

Furthermore, although FIG. 1 shows the TR terminal connected to the auxiliary winding T3 via the resistors 29 and 30, the TR terminal may be directly connected to the auxiliary winding T3 using, for the input side of the transformer reset detection circuit 4, an element having a high dielectric strength.

The secondary-side on-time signal generation circuit 14 is connected to a drive circuit 11 and the transformer reset detection circuit 4. According to the control signal VGATE and the transformer reset pulse signal Vreset, the secondary-side on-time signal generation circuit 14 generates a secondary-side on-time signal V2on which is at high level only during a time period (secondary-side on-time T2on) in which the secondary-side current Isec flows. More specifically, the secondary-side on-time signal generation circuit 14 generates the secondary-side on-time signal V2on which is at high level during a time period from when the switching element 1 is turned off to when the transformer reset pulse signal Vreset is generated. In other words, the secondary-side on-time signal V2on indicates the secondary-side on-time T2on.

The switching control circuit 5 controls, according to the feedback signal VEAO, the switching operation of the switching element 1 so that the output voltage Vo falls within a normal operation specified range. Furthermore, the switching control circuit 5 controls the switching operation of the switching element 1 according to the amount of the load 26 using three control methods so as to adjust the power supplied to the load 26.

More specifically, the switching control circuit 5 controls the switching operation of the switching element 1 using a pulse width modulation (PWM) control method, a pulse frequency modulation (PFM) control method, and a control method for fixing the on-duty of a secondary current (hereinafter also referred to as a secondary current on-duty fixing control method).

The PWM control method is a method of controlling, according to the feedback signal VEAO, a switching element current peak IDP so that the output voltage Vo falls within the normal operation specified range. Here, the switching element current peak IDP is a peak value of a switching element current Ids flowing through the switching element 1. The PFM control method is a method of controlling, according to the feedback signal VEAO, a switching frequency FOSC of the switching element 1 so that the output voltage Vo falls within the normal operation specified range. The secondary current on-duty fixing control method is a method of controlling an output current Io to be constant according to the secondary-side on-time T2on indicated by the secondary-side on-time signal V2on.

The switching control circuit 5 switches between the PWM control method and the PFM control method according to the feedback signal VEAO.

Specifically, the switching control circuit 5 performs the PWM control when the feedback signal VEAO is lower than an element current reference level VLIMIT, that is, when the output voltage Vo is higher than a first voltage level which is equivalent to the element current reference level VLIMIT. On the other hand, the switching control circuit 5 performs the PFM control when the feedback signal VEAO is higher than the element current reference level VLIMIT, that is, when the output voltage Vo is lower than the first voltage level equivalent to the element current reference level VLIMIT.

The switching control circuit 5 includes a drain current detection circuit 2, a drain current control circuit 8, an RS latch circuit 9, an oscillator 10, a drive circuit 11, a clock signal selection circuit 12, and a secondary current on-duty control circuit 13.

The drain current detection circuit 2 monitors the switching element current Ids flowing through the switching element 1, and generates an element current detection signal VCL indicating the magnitude of the switching element current Ids. Furthermore, the drain current detection circuit 2 supplies the drain current control circuit 8 with the generated element current detection signal VCL.

The oscillator 10 is connected to the feedback control circuit 3 and the clock signal selection circuit 12. When the load 26 increases and the feedback signal VEAO becomes higher than the element current reference level VLIMIT, the oscillator 10 generates a first clock signal set1 which indicates a switching cycle T that has been adjusted according to a difference between the feedback signal VEAO and the element current reference level VLIMIT so that the switching cycle T decreases as the feedback signal VEAO increases.

Furthermore, the oscillator 10 provides the generated first clock signal set1 to the clock signal selection circuit 12.

The secondary current on-duty control circuit 13 receives the secondary-side on-time signal V2on that is the output signal of the secondary-side on-time signal generation circuit 14. The secondary current on-duty control circuit 13 generates a second clock signal set2 for turning on the switching element 1 at a time when the on-duty of a secondary current (hereinafter referred to as the secondary current on-duty) becomes constant at a predetermined value, and provides the generated second clock signal set2 to the clock signal selection circuit 12. Here, the secondary current on-duty is a ratio between a time period from when the switching element 1 is turned off to when the secondary-side current Isec finishes flowing (the secondary-side on-time T2on) and the switching cycle T of the switching element 1.

The drain current control circuit 8 is connected to the drain current detection circuit 2, the feedback control circuit 3, and the RS latch circuit 9. The drain current control circuit 8 compares the element current detection signal VCL with a smaller one of the feedback signal VEAO and the element current reference level VLIMIT, and provides the result of the comparison to a reset terminal of the RS latch circuit 9. More specifically, when the feedback signal VEAO is lower than the element current reference level VLIMIT, the drain current control circuit 8 generates a signal that varies in value at a time when the element current detection signal VCL matches the feedback signal VEAO. On the other hand, when the feedback signal VEAO is higher than the element current reference level VLIMIT, the drain current control circuit 8 generates a signal that varies in value at a time when the element current detection signal VCL matches the element current reference level VLIMIT.

The drive circuit 11 is connected to the RS latch circuit 9. The drive circuit 11 converts the output signal of the RS latch circuit 9 into either a current signal or a voltage signal adequate for controlling the control terminal of the switching element 1, so as to generate the control signal VGATE that drives the switching element 1.

This means that the timing of turning the switching element 1 on is controlled according to an input signal of a set terminal of the RS latch circuit 9. Furthermore, the timing of turning the switching element 1 off is controlled according to an input signal of the reset terminal of the RS latch circuit 9.

The clock signal selection circuit 12 selects a signal having a lower frequency from among the first clock signal set1 generated by the oscillator 10 and the second clock signal set2 generated by the secondary current on-duty control circuit 13, and transmits the selected signal to the drive circuit 11.

Here, the output current Io, the secondary current on-duty D2on, and the output voltage Vo are given by the following (Equation 1), (Equation 2) and (Equation 3), respectively.

$$Io = (½) \times n \times IDP \times D2on \qquad \text{(Equation 1)}$$

$$D2on = T2on/T \qquad \text{(Equation 2)}$$

$$Vo = L \times n \times IDP/T2on \qquad \text{(Equation 3)}$$

Here, n is a ratio between the number of turns of the primary winding T1 and the number of turns of the secondary winding T2. IDP is a peak of the switching element current, T is a switching cycle, and L is an inductance value of the primary winding T1 of the power transformer 21.

As previously described, the oscillator 10 decreases the switching cycle T when the load increases. Therefore, when the output voltage Vo and the switching element current peak IDP are both constant, (Equation 1), (Equation 2), and (Equation 3) above give the secondary current on-duty D2on which increases as the load increases.

Thus, the first clock signal set1 generated by the oscillator 10 is lower in frequency than the second clock signal set2 when the load is small and the secondary current on-duty D2on is smaller than the predetermined value. When the load increases and the secondary current on-duty D2on reaches the predetermined value, the second clock signal set2 becomes lower in frequency than the first clock signal set1. Therefore, the clock signal selection circuit 12 provides the first clock signal set1 to the set terminal of the RS latch circuit 9 when the load is light and the secondary current on-duty D2on is smaller than the predetermined value, whereas the clock signal selection circuit 12 provides the second clock signal set2 to the set terminal of the RS latch circuit 9 when the load increases and the secondary current on-duty D2on reaches the predetermined value.

This means that in the range from no load to a light load until the secondary current on-duty D2on reaches the predetermined value, it is the first clock signal set1, which is adjusted by the oscillator 10 according to the feedback signal VEAO, that determines the switching frequency FOSC in a constant voltage control range where the secondary-side output voltage is controlled to be constant. When the secondary current on-duty D2on reaches the predetermined value, it is the second clock signal set2 generated by the secondary current on-duty control circuit 13 that controls the switching frequency FOSC based on (Equation 1) above so that the secondary-side output current Io becomes constant.

Figure 2:
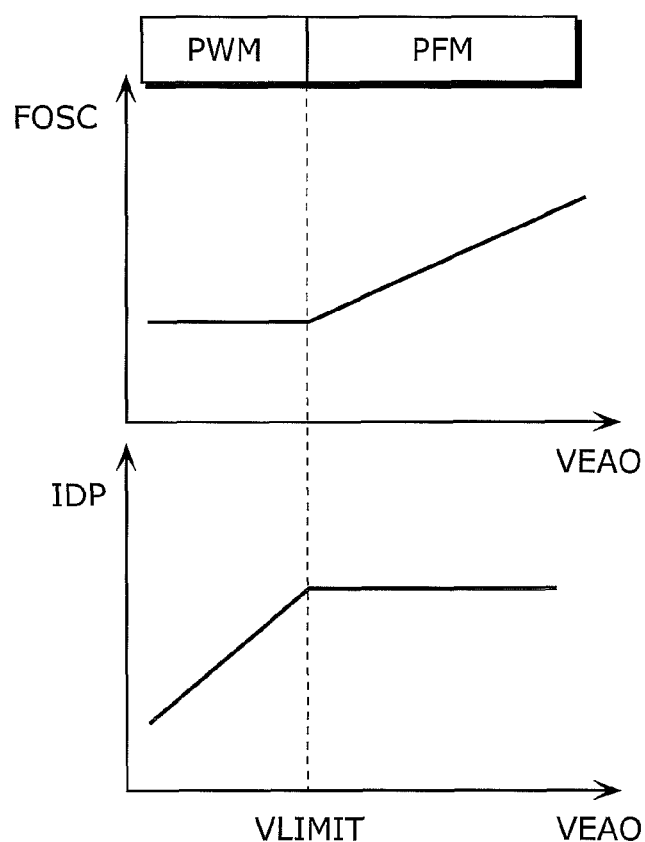
FIG. 2 is a diagram showing a relationship between a feedback signal VEAO and a switching frequency FOSC and a relationship between the feedback signal VEAO and a switching element current peak IDP in a switching power supply device according to Embodiment 1 of the present invention.

FIG. 2 is a diagram showing a relationship between the feedback signal VEAO and the switching frequency FOSC and a relationship between the feedback signal VEAO and the switching element current peak IDP.

Here, the feedback signal VEAO increases as the load 26 connected to the secondary-side output increases.

In the switching power supply device 100 according to Embodiment 1 of the present invention, the drain current control circuit 8 and the oscillator 10 receive the feedback signal VEAO and are controlled thereby. More specifically, as shown in FIG. 2, in the small-load range where the feedback signal VEAO is lower than the element current reference level VLIMIT, the switching control circuit 5 performs the PWM control for controlling the switching element current peak IDP according to the feedback signal VEAO. Furthermore, in the large-load range where the feedback signal VEAO is higher than the element current reference level VLIMIT, the switching control circuit 5 performs the PFM control for controlling the switching frequency FOSC according to the feedback signal VEAO.

In such a manner, the switching power supply device 100 according to Embodiment 1 of the present invention switches between the PWM control and the PFM control according to the feedback signal VEAO to perform the constant voltage control on the secondary-side output voltage. In addition, when the load increases and the secondary current on-duty reaches the predetermined value, the switching power supply device 100 performs the constant current control on the secondary-side output current Io through the secondary current on-duty fixing control by which the on-duty of the secondary current is maintained at a predetermined value.

Here, there are two types of the PWM control performed by the switching power supply device 100: one is a voltage-mode PWM control by which the on-time of the switching element 1 is controlled, and the other is a current-mode PWM control by which the switching element current peak of the switching element 1 is controlled. The present invention may use any of these types of the PWM control.

The overvoltage detection circuit 6 is connected to the secondary-side on-time signal generation circuit 14 and the feedback control circuit 3, and generates an overvoltage detection signal Vfault according to the secondary-side on-time signal V2on.

More specifically, the overvoltage detection circuit 6 generates the overvoltage detection signal Vfault when the secondary-side on-time T2on indicated by the secondary-side on-time signal V2on becomes smaller than a set value (overvoltage detection secondary-side on-time T2onlim1). In other words, the overvoltage detection circuit 6 uses the secondary-side on-time T2on to detect that the TR terminal or the like is opened.

When the overvoltage detection circuit 6 generates the overvoltage detection signal Vfault, the switching control circuit 5 controls the switching operation of the switching element 1 so that the output voltage Vo becomes equal to or below an overvoltage specified value.

More specifically, the feedback control circuit 3 decreases the feedback signal VEAO when the overvoltage detection circuit 6 generates the overvoltage detection signal Vfault. That is to say, when the overvoltage detection circuit 6 generates the overvoltage detection signal Vfault, the feedback control circuit 3 varies the feedback signal VEAO in value in a direction in which the feedback signal VEAO varies in value when the output voltage Vo increases.

With this, when the overvoltage detection circuit 6 generates the overvoltage detection signal Vfault, the switching control circuit 5 controls the switching operation of the switching element 1 according to the varied feedback signal VEAO so that the output voltage Vo becomes equal to or below the overvoltage specified value. To be more specific, the switching control circuit 5 decreases both the switching frequency FOSC and the switching element current peak IDP.

Hereinafter, the feedback control circuit 3 and the overvoltage detection circuit 6 are described in detail.

Figure 3A:
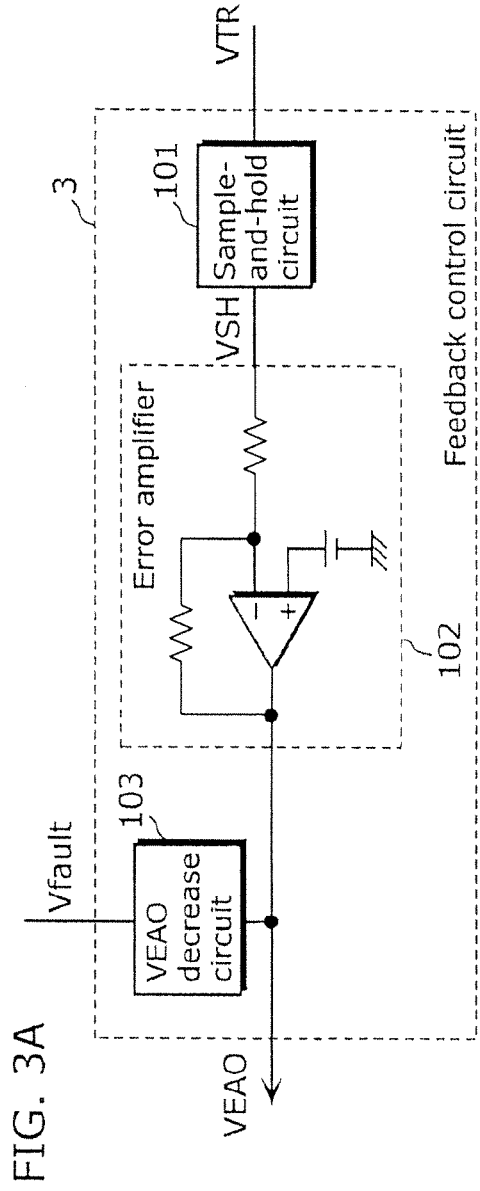
FIG. 3A is a block diagram showing an example of a configuration of a feedback control circuit according to Embodiment 1 of the present invention.

FIG. 3A is a diagram showing an example of a configuration of the feedback control circuit 3 included in the switching power supply device 100 according to Embodiment 1 of the present invention.

As shown in FIG. 3A, the feedback control circuit 3 includes a sample-and-hold circuit 101, an error amplifier 102, and a VEAO decrease circuit 103.

The sample-and-hold circuit 101 samples and holds a TR terminal voltage VTR at a time when the secondary-side current Isec flowing through the secondary winding T2 of the power transformer 21 decreases to approximately zero after the switching element 1 is turned off, so as to generate a TR terminal sampling signal VSH which serves as an output voltage detection signal.

The error amplifier 102 compares the TR terminal sampling signal VSH with a reference level stored therein and amplifies the TR terminal sampling signal VSH, so as to generate the feedback signal VEAO.

The VEAO decrease circuit 103 is connected to the error amplifier 102, and receives the overvoltage detection signal Vfault generated by the overvoltage detection circuit 6 and the feedback signal VEAO. The VEAO decrease circuit 103 decreases the feedback signal VEAO upon receiving the overvoltage detection signal Vfault at high level.

Figure 3B:
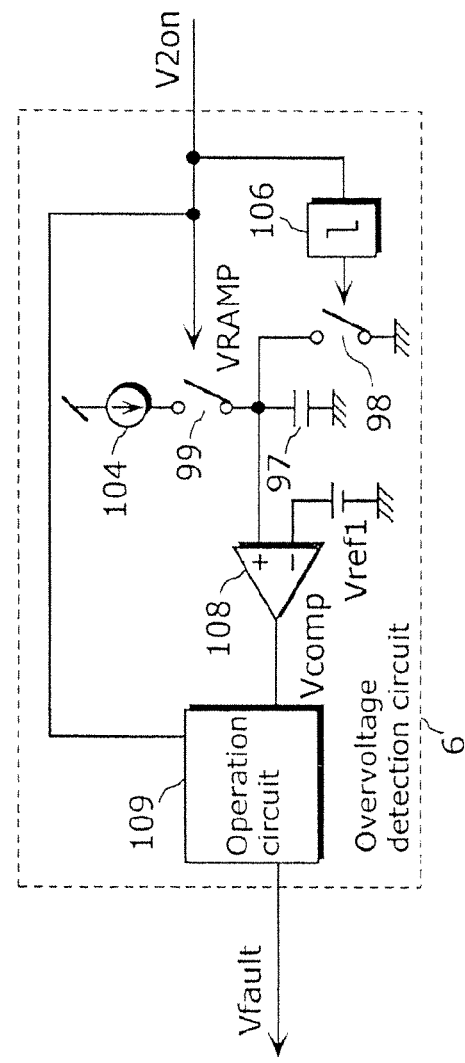
FIG. 3B is a block diagram showing an example of a configuration of an overvoltage detection circuit according to Embodiment 1 of the present invention.

FIG. 3B is a diagram showing an example of a configuration of the overvoltage detection circuit 6.

The overvoltage detection circuit 6 includes a pulse generation circuit 106, a constant current source 104, switches 98 and 99, a capacitor 97, and a comparator 108, and an operation circuit 109.

The switch 99 is connected between the constant current source 104 and the capacitor 97 and is turned on and off according to the secondary-side on-time signal V2on. More specifically, the switch 99 is turned on during the secondary-side on-time T2on. This allows the capacitor 97 to be charged by the constant current source 104.

The pulse generation circuit 106 generates pulses only when the secondary-side on-time signal V2on rises.

The switch 98 is connected to the pulse generation circuit 106 and is turned on, according to the pulses generated by the pulse generation circuit 106, every time the secondary-side on-time signal V2on rises. When the switch 98 is turned on, the charge of the capacitor 97 is discharged.

In such a manner, the overvoltage detection circuit 6 generates a rate signal VRAMP that rises with a gradient corresponding to the current value of the constant current source 104 and is reset every time the secondary-side on-time signal V2on rises.

The comparator 108 is connected to the capacitor 97, compares an overvoltage detection level Vref1 with the rate signal VRAMP, and generates a comparison signal Vcomp indicating the result of the comparison.

The operation circuit 109 receives the secondary-side on-time signal V2on and the comparison signal Vcomp. The operation circuit 109 generates the overvoltage detection signal Vfault at high level in the case where the rate signal VRAMP did not exceed the overvoltage detection level Vref1 during the switching cycle of the switching element 1.

FIG. 4 is a timing chart showing operating waveforms of the switching power supply device 100 according to Embodiment 1 of the present invention before and after the TR terminal or a terminal of the auxiliary winding is opened.

When the TR terminal or a terminal of the auxiliary winding is opened during a normal operation (at time t1), a weak voltage waveform signal is provided to the TR terminal even after the terminal is opened.

During the normal operation before the terminal is opened, the voltage level of the TR terminal voltage VTR indicates a value proportional to the output voltage Vo, whereas after the terminal is opened, the voltage level rapidly decreases because there is no normal current path to the auxiliary winding T3.

When the VTR voltage level decreases, the feedback control circuit 3 increases the feedback signal VEAO as in the case where the load is heavy during the normal operation.

As a result, the switching element current peak IDP reaches its maximum, making the switching frequency FOSC maximized as well. This leads to a supply of excessive energy to the output, causing a rapid rise of the output voltage Vo on the secondary side.

The pulse width of the TR terminal voltage VTR indicating the secondary-side on-time T2on has the property of decreasing as the output voltage Vo increases as shown in (Equation 3). Such a property is maintained even when the TR terminal or a terminal of the auxiliary winding is opened.

The rate signal VRAMP exceeds the overvoltage detection level Vref1 in every cycle during the normal operation, and thus the comparison signal Vcomp is generated in every cycle.

After the terminal is opened, a decrease in the secondary-side on-time T2on leads to a decrease in the peak value of the rate signal VRAMP, and the peak value of the rate signal VRAMP eventually becomes lower than the overvoltage detection level Vref1. The operation circuit 109 detects such a decrease in the peak value of the rate signal VRAMP, and generates the overvoltage detection signal Vfault at high level.

When the operation circuit 109 generates the overvoltage detection signal Vfault at high level, the VEAO decrease circuit 103 decreases the feedback signal VEAO. As a result, the switching control circuit 5 minimizes the switching element current peak IDP and the switching frequency FOSC as in the case where the load is light. This minimizes the energy supplied to the output terminal, resulting in a decrease in the output voltage Vo.

Figure 5:
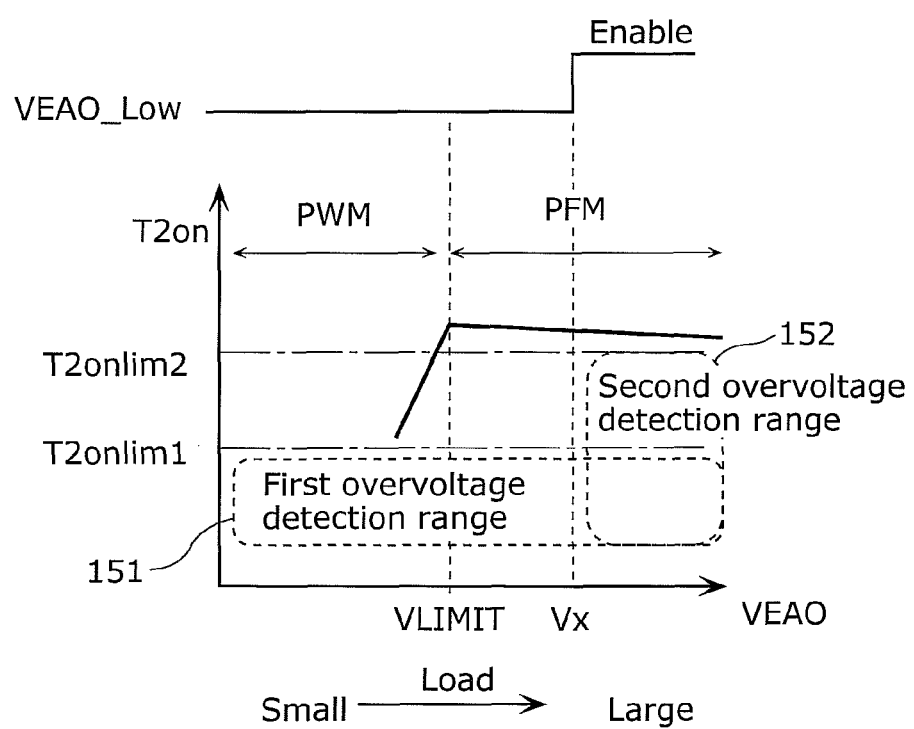
FIG. 5 is a diagram showing a relationship between a feedback signal VEAO and a secondary-side on-time T2on, which indicates an overvoltage detection range of a switching power supply device according to Embodiment 1 of the present invention.

FIG. 5 is a diagram showing a relationship between the feedback signal VEAO and the secondary-side on-time T2on.

The overvoltage detection level Vref1 is a threshold for setting the overvoltage detection secondary-side on-time T2onlim1. A first overvoltage detection range 151 shown in FIG. 5 is a range in which the switching power supply device 100 detects overvoltage.

Here, if the overvoltage detection secondary-side on-time T2onlim1 is a large value, there is a possibility of erroneously detecting the overvoltage during the normal operation, and the output signal might be limited as a result. Thus, the overvoltage detection secondary-side on-time T2onlim1 is set to a value well below the secondary-side on-time T2on that is possibly taken in all the load ranges during the normal operation. That is to say, the overvoltage detection secondary-side on-time T2onlim1 is smaller than the minimum value of the secondary-side on-time T2on when the output voltage Vo is controlled to be within the normal operation specified range. Furthermore, the overvoltage detection secondary-side on-time T2onlim1 is a constant value in all the load ranges.

In such a manner, the switching power supply device 100 according to Embodiment 1 of the present invention is capable of suppressing an abnormal rise of the output voltage Vo that occurs when the TR terminal or a terminal of the auxiliary winding T3 is opened. This enables the switching power supply device 100 to prevent a break of the switching power supply device 100 and the load on the secondary side.

(Embodiment 2)

Figure 6:
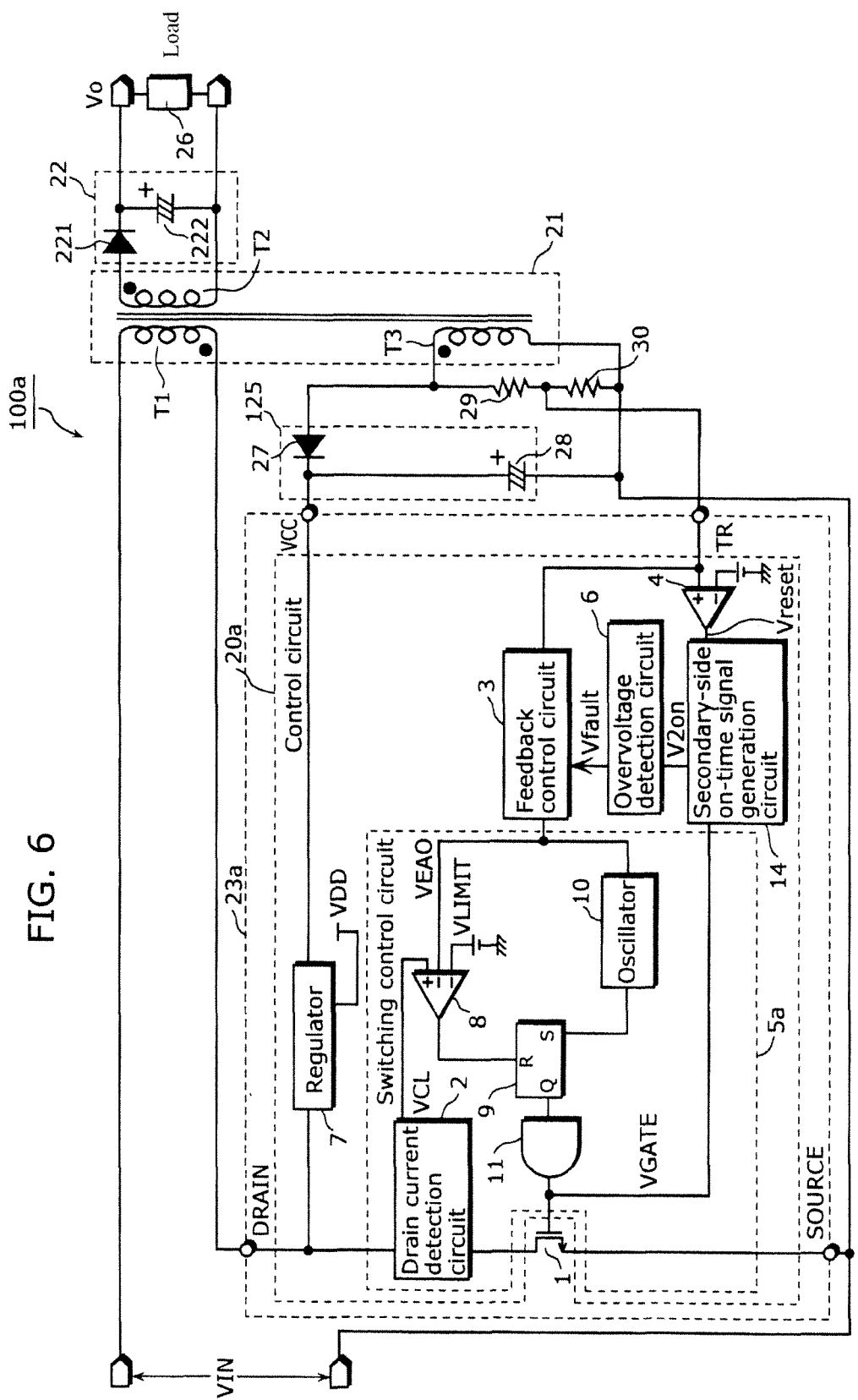
FIG. 6 is a block diagram showing a configuration of a switching power supply device according to Embodiment 2 of the present invention.

FIG. 6 is a block diagram showing a configuration of a switching power supply device 100a according to Embodiment 2 of the present invention.

Whereas the switching power supply device 100 according to Embodiment 1 of the present invention includes the secondary current on-duty control circuit 13 and performs not only the constant voltage control but also the constant current control using the auxiliary winding T3, the switching power supply device 100a according to Embodiment 2 does not include the secondary current on-duty control circuit 13 and performs only the constant voltage control.

Note that constituent elements corresponding to the constituent elements described in Embodiment 1 above are given the same numeral references, and hereinafter, different aspects are mainly described and the descriptions of the same aspects are omitted.

The switching power supply device 100a according to Embodiment 2 of the present invention includes a semiconductor device 23a, a power transformer 21, an output voltage generation circuit 22, a load 26, an auxiliary power generation circuit 125, and resistors 29 and 30. The semiconductor device 23a includes a switching element 1 and a control circuit 20a.

The control circuit 20a generates, based on the waveform of a voltage at the TR terminal, a control signal VGATE which is to be applied to the control terminal of the switching element 1, so as to control the switching operation of the switching element 1.

The control circuit 20a includes a switching control circuit 5a instead of the switching control circuit 5 shown in FIG. 1.

The switching control circuit 5a is different in configuration from the switching control circuit 5 in not including the clock signal selection circuit 12 or the secondary current on-duty control circuit 13.

The oscillator 10 is connected to the feedback control circuit 3 and the RS latch circuit 9, and provides the generated first clock signal set1 to the set terminal of the RS latch circuit 9.

With the above configuration, the switching power supply device 100a according to Embodiment 2 of the present invention is capable of, as with the switching power supply device 100 according to Embodiment 1, suppressing an abnormal rise of the output voltage Vo that occurs when the TR terminal or a terminal of the auxiliary winding T3 is opened. This enables the switching power supply device 100a to prevent a break of the switching power supply device 100a and the load on the secondary side.

(Embodiment 3)

Embodiment 3 of the present invention describes a variation of the switching power supply device 100a according to Embodiment 2 above.

Figure 7:
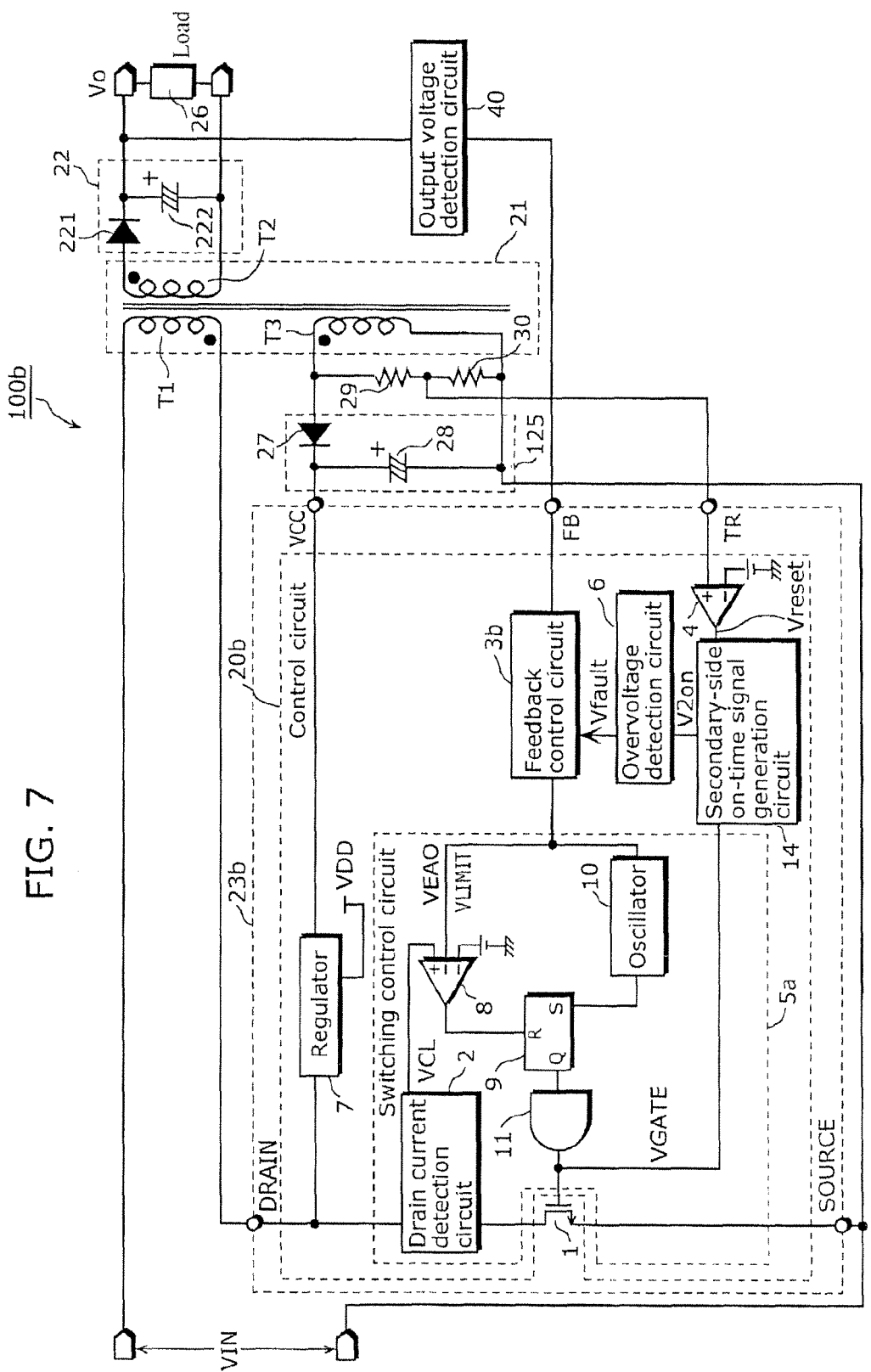
FIG. 7 is a block diagram showing a configuration of a switching power supply device according to Embodiment 3 of the present invention.

FIG. 7 is a block diagram showing a configuration of a switching power supply device 100b according to Embodiment 3 of the present invention.

Hereinafter, the switching power supply device 100b according to Embodiment 3 of the present invention is described with reference to the drawings.

Note that constituent elements corresponding to the constituent elements described in Embodiments 1 and 2 above are given the same numeral references, and hereinafter, different aspects are mainly described and the descriptions of the same aspects are omitted.

Whereas the feedback control circuit 3 of the switching power supply device 100a according to Embodiment 2 of the present invention is connected to the auxiliary winding T3 via the TR terminal and the resistors 29 and 30, a feedback control circuit 3b of the switching power supply device 100b according to Embodiment 3 is connected to an output voltage detection circuit 40 via a newly-provided FB terminal.

The switching power supply device 100b according to Embodiment 3 of the present invention includes the output voltage detection circuit 40 in addition to the constituent elements of the switching power supply device 100a according to Embodiment 2. Also, a control circuit 20b included in a semiconductor device 23b is different in configuration from the control circuit 20a of Embodiment 2. Specifically, the semiconductor device 23b further includes an FB terminal.

The feedback control circuit 3b is also different in configuration from the feedback control circuit 3 of Embodiment 2.

The output voltage detection circuit 40 directly detects the secondary-side output voltage. To be more specific, the output voltage detection circuit 40 generates, using a photocoupler or the like, a current signal IFB that varies in value according to the output voltage Vo, and transmits the generated current signal IFB to the FB terminal.

The switching power supply device 100b according to Embodiment 3 of the present invention includes the semiconductor device 23b, a power transformer 21, an output voltage generation circuit 22, a load 26, an auxiliary power generation circuit 125, resistors 29 and 30, and the output voltage detection circuit 40. The semiconductor device 23b includes a switching element 1 and the control circuit 20b.

The semiconductor device 23b is a semiconductor device (semiconductor device for switching power supply) whose components are formed on the same semiconductor substrate. The semiconductor device 23b includes five terminals as external terminals, namely, a DRAIN terminal, a VCC terminal, a TR terminal, an FB terminal, and a SOURCE terminal.

The output voltage detection circuit 40 is connected to the FB terminal and the output voltage generation circuit 22 provided on the secondary side.

The control circuit 20b generates, based on the waveform of a voltage at the TR terminal and the current signal IFB provided to the FB terminal from the output voltage detection circuit 40, a control signal VGATE which is to be applied to the control terminal of the switching element 1, so as to control the switching operation of the switching element 1.

The control circuit 20b includes a regulator 7, a switching control circuit 5a, the feedback control circuit 3b, an overvoltage detection circuit 6, a secondary-side on-time signal generation circuit 14, and a transformer reset detection circuit 4.

The feedback control circuit 3b is connected to the FB terminal. The feedback control circuit 3b generates a feedback signal VEAO corresponding to a voltage level of the output voltage Vo. More specifically, the feedback control circuit 3b converts the current signal IFB provided to the FB terminal into the feedback signal VEAO.

Figure 8:
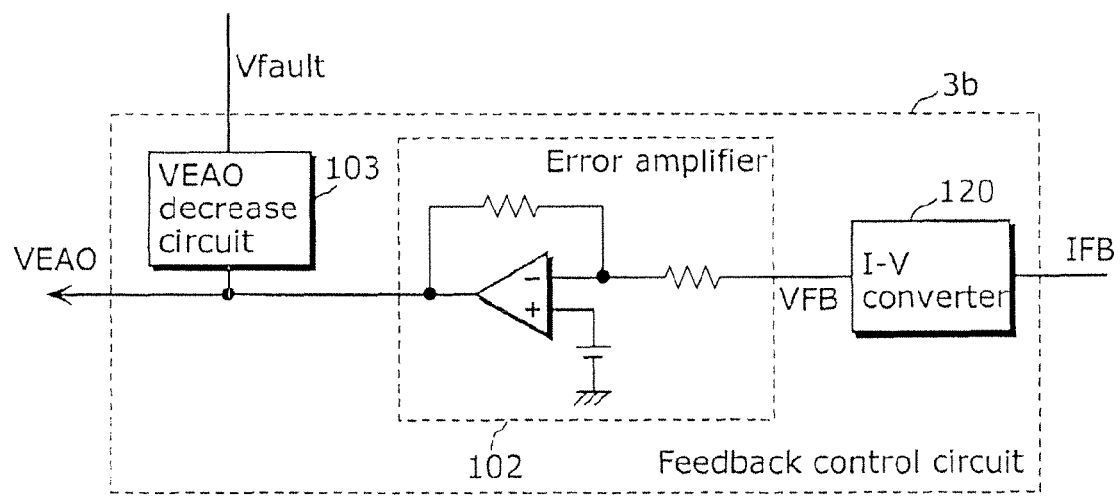
FIG. 8 is a block diagram showing an example of a configuration of a feedback control circuit according to Embodiment 3 of the present invention.

FIG. 8 is a block diagram of the feedback control circuit 3b included in the switching power supply device 100b according to Embodiment 3 of the present invention.

As shown in FIG. 8, the feedback control circuit 3b includes an I-V converter 120, an error amplifier 102, and a VEAO decrease circuit 103.

The I-V converter 120 is connected to the FB terminal. The I-V converter 120 converts, into a voltage signal VFB, the current signal IFB that varies in value according to the output voltage Vo detected by the output voltage detection circuit 40, and provides the obtained voltage signal VFB to the error amplifier 102.

The error amplifier 102 compares the voltage signal VFB with a reference level stored therein and amplifies the voltage signal VFB, so as to generate the feedback signal VEAO.

The VEAO decrease circuit 103 is connected to the error amplifier 102, and receives the overvoltage detection signal Vfault generated by the overvoltage detection circuit 6 and the feedback signal VEAO. The VEAO decrease circuit 103 decreases the feedback signal VEAO upon receiving the overvoltage detection signal Vfault at high level.

With the above configuration, the switching power supply device 100b according to Embodiment 3 of the present invention is capable of, as in Embodiments 1 and 2, suppressing an abnormal rise of the output voltage Vo that occurs when the TR terminal or a terminal of the auxiliary winding T3 is opened. This enables the switching power supply device 100*b* to prevent a break of the switching power supply device 100*b* and the load on the secondary side.

(Embodiment 4)

Embodiment 4 of the present invention describes a variation of the switching power supply device 100*b* according to Embodiment 3 above.

Figure 9:
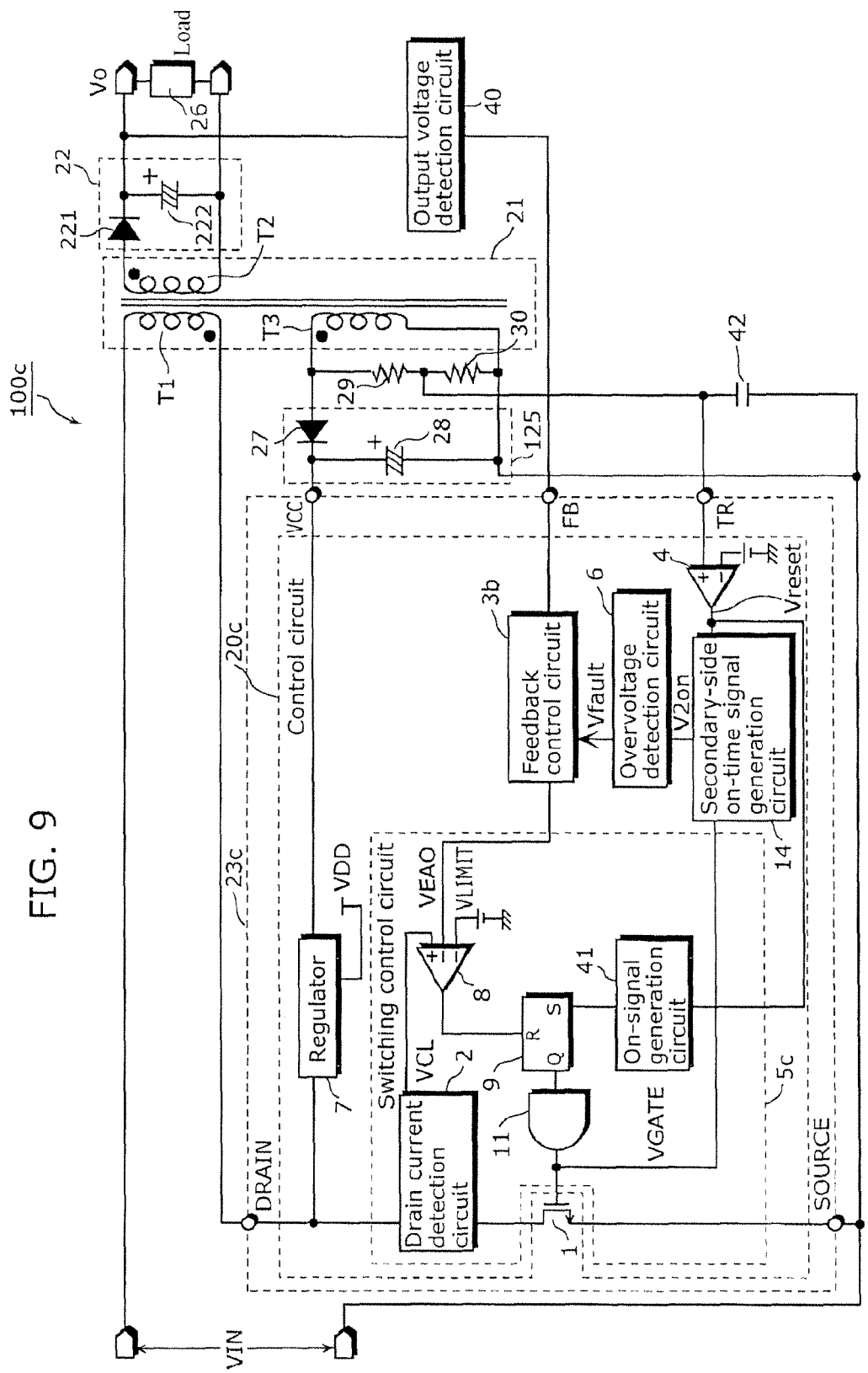
FIG. 9 is a block diagram showing a configuration of a switching power supply device according to Embodiment 4 of the present invention.

FIG. 9 is a block diagram showing a configuration of a switching power supply device 100*c* according to Embodiment 4 of the present invention.

Hereinafter, the switching power supply device 100*c* according to Embodiment 4 of the present invention is described with reference to the drawings.

Note that constituent elements corresponding to the constituent elements described in Embodiments 1 to 3 above are given the same numeral references, and hereinafter, different aspects are mainly described and the descriptions of the same aspects are omitted.

The switching power supply device 100*c* according to Embodiment 4 of the present invention includes a capacitor 42 in addition to the constituent elements of the switching power supply device 100*b* according to Embodiment 3. Also, a switching control circuit 5*c* included in a control circuit 20*c* is different in configuration from the switching control circuit 5*a* of Embodiment 3. More specifically, the switching control circuit 5*c* is different from the switching control circuit 5*a* in including an on-signal generation circuit 41 instead of the oscillator 10.

The switching power supply device 100*c* includes a semiconductor device 23*c*, a power transformer 21, an output voltage generation circuit 22, a load 26, an auxiliary power generation circuit 125, resistors 29 and 30, and an output voltage detection circuit 40. The semiconductor device 23*c* includes a switching element 1 and the control circuit 20*c*.

The semiconductor device 23*c* is a semiconductor device (semiconductor device for switching power supply) whose components are formed on the same semiconductor substrate. The semiconductor device 23*c* includes five terminals as external terminals, namely, a DRAIN terminal, a VCC terminal, a TR terminal, an FB terminal, and a SOURCE terminal.

The control circuit 20*c* generates, based on the waveform of a voltage at the TR terminal and the current signal IFB provided to the FB terminal from the output voltage detection circuit 40, a control signal VGATE which is to be applied to the control terminal of the switching element 1, so as to control the switching operation of the switching element 1.

The control circuit 20*c* includes a regulator 7, the switching control circuit 5*c*, a feedback control circuit 3*b*, an overvoltage detection circuit 6, a secondary-side on-time signal generation circuit 14, and a transformer reset detection circuit 4.

The switching control circuit 5*c* includes a drain current detection circuit 2, a drain current control circuit 8, an RS latch circuit 9, an on-signal generation circuit 41, and a drive circuit 11.

Here, the capacitor 42 is connected to the TR terminal. With this, as compared to the waveform of the pulse voltage Vbias induced in the auxiliary winding T3, the waveform of the voltage at the TR terminal delays by an amount of time determined according to the resistor 29 and the capacitor 42.

The transformer reset detection circuit 4 monitors the waveform of the voltage at the TR terminal, and generates a transformer reset pulse signal Vreset at a time when the voltage at the TR terminal decreases to a preset threshold or below after the switching element 1 is turned off.

The on-signal generation circuit 41 is connected to the transformer reset detection circuit 4 and the RS latch circuit 9. The on-signal generation circuit 41 generates a pulse signal according to the transformer reset pulse signal Vreset and provides it to the set terminal of the RS latch circuit 9.

With the above configuration, the switching power supply device 100*c* according to Embodiment 4 of the present invention functions as a quasi-resonant switching power supply device that achieves zero-voltage switching by setting, through adjustment of the capacitor 42 and the resistor 29 that are connected to the TR terminal, the timing of turning on the switching element 1 to a time point at which the pulse voltage Vbias induced in the auxiliary winding T3 reaches its minimum after the switching element 1 is turned off.

In addition, the switching power supply device 100*c* according to Embodiment 4 of the present invention is capable of suppressing an abnormal rise of the output voltage Vo as in Embodiments 1 to 3. This enables the switching power supply device 100*c* to prevent a break of the switching power supply device 100*c* and the load on the secondary side.

(Embodiment 5)

Embodiment 5 of the present invention describes a variation of the switching power supply device 100 according to Embodiment 1 above.

Figure 10:
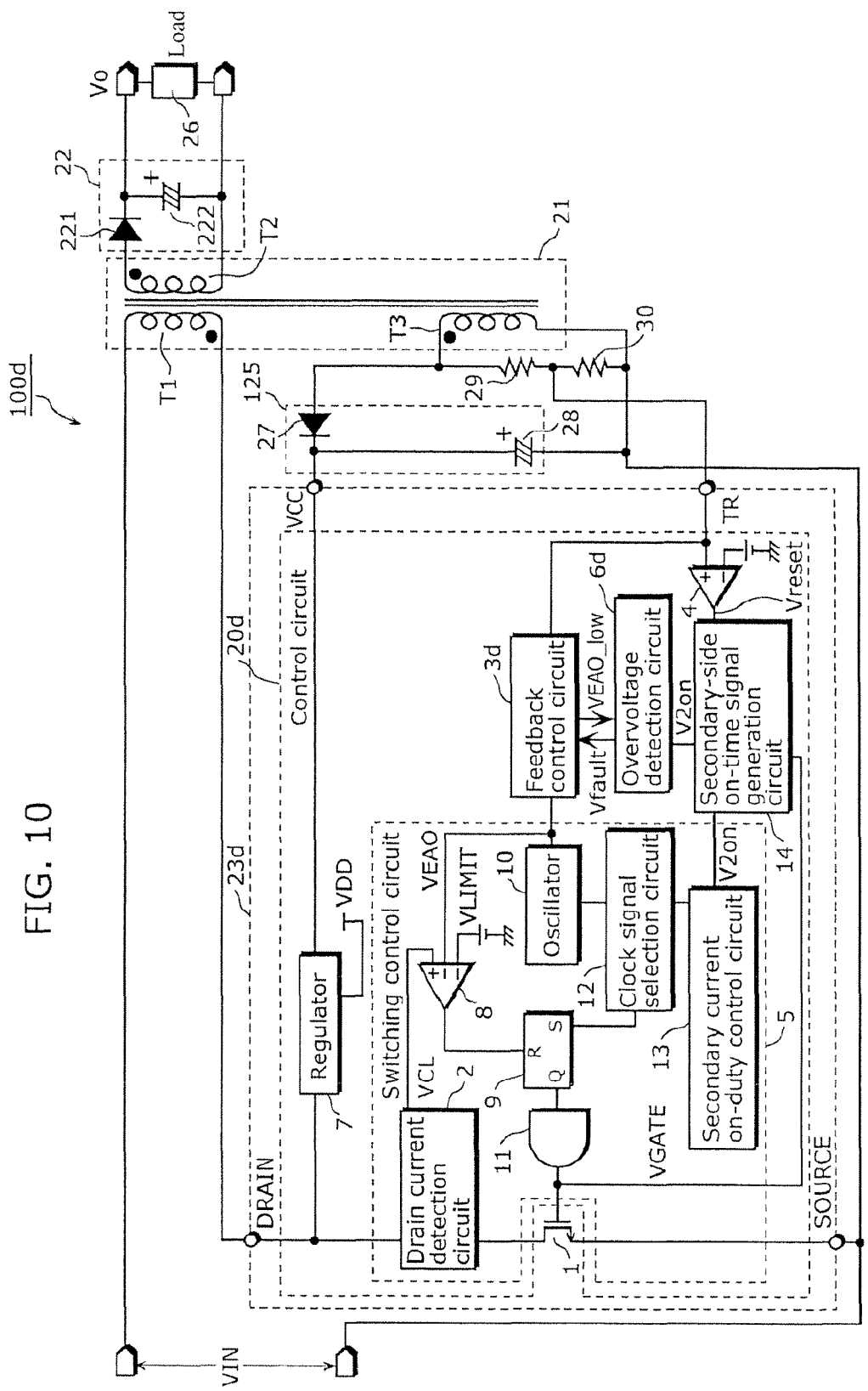
FIG. 10 is a block diagram showing a configuration of a switching power supply device according to Embodiment 5 of the present invention.

FIG. 10 is a block diagram showing a configuration of a switching power supply device 100*d* according to Embodiment 5 of the present invention.

Hereinafter, the switching power supply device 100*d* according to Embodiment 5 of the present invention is described with reference to the drawings.

Note that constituent elements corresponding to the constituent elements described in Embodiments 1 to 4 above are given the same numeral references, and hereinafter, different aspects are mainly described and the descriptions of the same aspects are omitted.

The switching power supply device 100*d* according to Embodiment 5 of the present invention is different from the switching power supply device 100 according to Embodiment 1 in configuration of a control circuit 20*d*. Specifically, a feedback control circuit 3*d* and an overvoltage detection circuit 6*d* are different in configuration from the feedback control circuit 3 and the overvoltage detection circuit 6 of Embodiment 1, respectively.

The switching power supply device 100*d* according to Embodiment 5 of the present invention includes a semiconductor device 23*d*, a power transformer 21, an output voltage generation circuit 22, a load 26, an auxiliary power generation circuit 125, and resistors 29 and 30. The semiconductor device 23*d* includes a switching element 1 and the control circuit 20*d*.

The semiconductor device 23*d* is a semiconductor device (semiconductor device for switching power supply) whose components are formed on the same semiconductor substrate. The semiconductor device 23*d* includes four terminals as external terminals, namely, a DRAIN terminal, a VCC terminal, a TR terminal, and a SOURCE terminal.

The control circuit 20*d* generates, based on the waveform of a voltage at the TR terminal, a control signal VGATE which is to be applied to the control terminal of the switching element 1, so as to control the switching operation of the switching element 1.

The control circuit 20*d* includes a regulator 7, a switching control circuit 5, the feedback control circuit 3*d*, the overvoltage detection circuit 6*d*, a secondary-side on-time signal generation circuit 14, and a transformer reset detection circuit 4.

Hereinafter, the feedback control circuit 3*d* and the overvoltage detection circuit 6*d* are described in detail.

Figure 11:
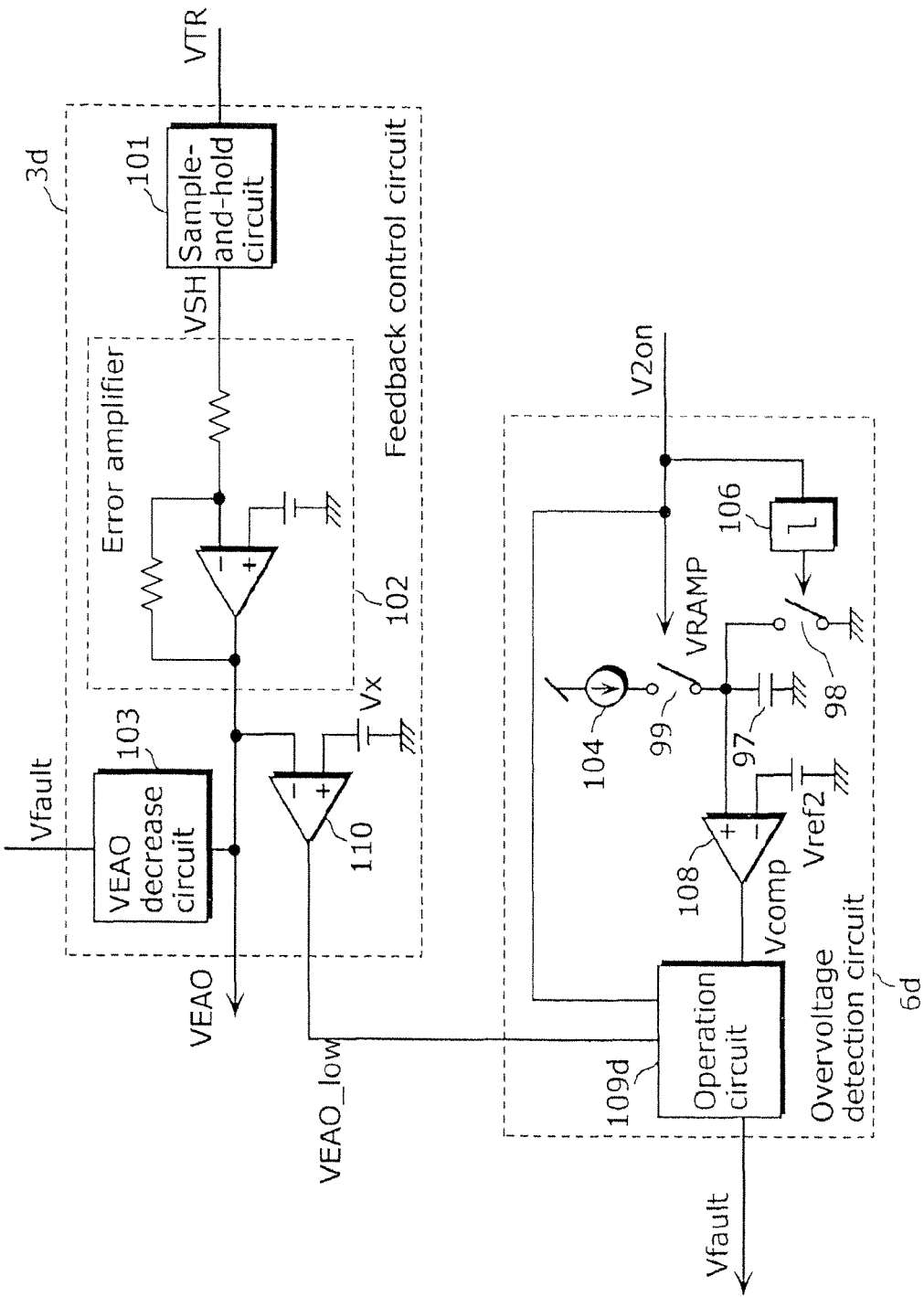
FIG. 11 is a block diagram showing an example of configurations of a feedback control circuit and an overvoltage detection circuit according to Embodiment 5 of the present invention.

FIG. 11 is a diagram showing an example of configurations of the feedback control circuit 3*d* and the overvoltage detection circuit 6d included in the switching power supply device 100d according to Embodiment 5 of the present invention.

The feedback control circuit 3d shown in FIG. 11 includes a heavy load detection circuit 110 in addition to the constituent elements of the feedback control circuit 3 shown in FIG. 3A.

The heavy load detection circuit 110 is connected to the error amplifier 102. The heavy load detection circuit 110 generates a heavy load detection signal VEAO_low at high level when the feedback signal VEAO becomes higher than a set heavy load detection level Vx. That is to say, the heavy load detection circuit 110 generates the heavy load detection signal VEAO_low at high level when the voltage level of the auxiliary winding T3 (the TR terminal voltage VTR) becomes lower than a heavy load detection voltage corresponding to the heavy load detection level Vx.

The overvoltage detection circuit 6d generates an overvoltage detection signal at high level when the heavy load detection circuit 110 generates the heavy load detection signal VEAO_low and the secondary-side on-time T2on indicated by the secondary-side on-time signal V2on becomes smaller than a set value (the overvoltage detection secondary-side on-time T2onlim1).

The overvoltage detection circuit 6d includes a pulse generation circuit 106, a constant current source 104, switches 98 and 99, a capacitor 97, and a comparator 108, and an operation circuit 109d. The overvoltage detection circuit 6d shown in FIG. 11 is different from the overvoltage detection circuit 6 shown in FIG. 3B with respect to the configuration of the operation circuit 109d and an overvoltage detection level Vref2 supplied to the comparator 108.

The comparator 108 is connected to the capacitor 97, compares the overvoltage detection level Vref2 with the rate signal VRAMP, and generates a comparison signal Vcomp indicating the result of the comparison.

The operation circuit 109d receives the secondary-side on-time signal V2on, the comparison signal Vcomp, and the heavy load detection signal VEAO_low. The operation circuit 109d generates the overvoltage detection signal Vfault at high level when the heavy load detection signal VEAO_low is at high level and the rate signal VRAMP did not exceed the overvoltage detection level Vref2 during the switching cycle of the switching element 1.

The overvoltage detection level Vref2 is a threshold for setting an overvoltage detection secondary-side on-time T2onlim2.

As previously described, the voltage level of the TR terminal voltage VTR indicates a value proportional to the output voltage Vo during the normal operation, whereas after the TR terminal or a terminal of the auxiliary winding is opened, the voltage level rapidly decreases because there is no normal current path to the auxiliary winding T3.

When the voltage level of the TR terminal voltage VTR decreases, the feedback signal VEAO increases as in the case where the load is heavy during the normal operation, thereby causing the level of the heavy load detection signal VEAO_low to be high.

As shown in FIG. 5, according to Embodiment 1 of the present invention, the detection of the overvoltage when the terminal is opened is performed regardless of the level of the feedback signal VEAO, and thus in order to prevent erroneous detection by the overvoltage detection circuit during the normal operation, the overvoltage detection secondary-side on-time T2onlim1 needs to be set lower than the minimum value of the secondary-side on-time that is possibly taken by the switching power supply device in at least all the load conditions.

In contrast, according to Embodiment 5 of the present invention, the overvoltage detection circuit 6d generates the overvoltage detection signal Vfault only when the feedback signal VEAO is equal to or higher than the heavy load detection level.

In other words, the overvoltage detection secondary-side on-time T2onlim2 only needs to be set lower than a minimum secondary-side on-time that is possibly taken by the switching power supply device 100d when the load is heavy. Thus, the overvoltage detection secondary-side on-time T2onlim2 is lower than the minimum secondary-side on-time T2on resulting when the voltage level of the auxiliary winding T3 is lower than the heavy load detection voltage corresponding to the overvoltage detection secondary-side on-time T2onlim2.

Thus, as shown in FIG. 5, the overvoltage detection secondary-side on-time T2onlim2 can be set higher than the overvoltage detection secondary-side on-time T2onlim1. As a result, the switching power supply device 100d according to Embodiment 5 of the present invention is capable of detecting and suppressing at an earlier stage an abnormal rise of the output voltage Vo that occurs when the TR terminal or a terminal of the auxiliary winding is opened. This enables the switching power supply device 100d to prevent a break of the switching power supply device 100d and the load on the secondary side.

In FIG. 5, the first overvoltage detection range 151 is a range in which the switching power supply device 100 according to Embodiment 1 detects overvoltage, whereas a second overvoltage detection range 152 is a range in which the switching power supply device 100d according to Embodiment 5 detects overvoltage.

The switching power supply device 100d according to Embodiment 5 of the present invention includes the secondary current on-duty control circuit 13 and has the control function to make the secondary-side output current Io constant using the pulses of the voltage induced in the auxiliary winding T3. However, the switching power supply device 100d does not have to include the secondary current on-duty control circuit 13 as in the switching control circuit 5a according to Embodiment 2 of the present invention.

(Embodiment 6)

Embodiment 6 of the present invention describes a variation of the switching power supply device 100 according to Embodiment 1 above.

Figure 12:
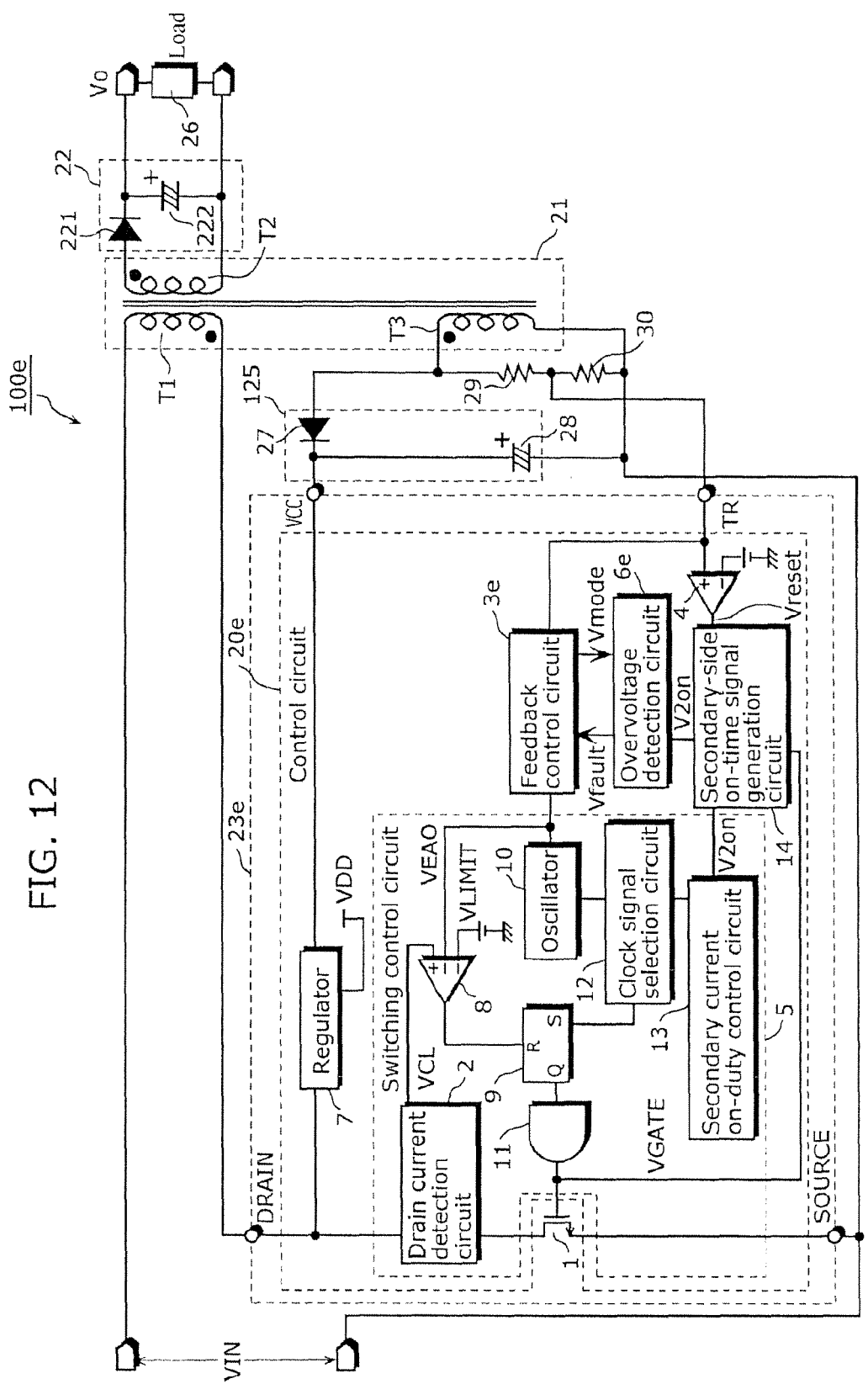
FIG. 12 is a block diagram showing a configuration of a switching power supply device according to Embodiment 6 of the present invention.

FIG. 12 is a block diagram showing a configuration of a switching power supply device 100e according to Embodiment 6 of the present invention.

Hereinafter, the switching power supply device 100e according to Embodiment 6 of the present invention is described with reference to the drawings.

Note that constituent elements corresponding to the constituent elements described in Embodiments 1 to 5 above are given the same numeral references, and hereinafter, different aspects are mainly described and the descriptions of the same aspects are omitted.

The switching power supply device 100e according to Embodiment 6 of the present invention is different from the switching power supply device 100 according to Embodiment 1 in configuration of a control circuit 20e. Specifically, a feedback control circuit 3e and an overvoltage detection circuit 6e are different in configuration from the feedback control circuit 3 and the overvoltage detection circuit 6 of Embodiment 1, respectively.

The switching power supply device 100e according to Embodiment 6 of the present invention includes a semiconductor device 23e, a power transformer 21, an output voltage generation circuit 22, a load 26, an auxiliary power generation circuit 125, and resistors 29 and 30. The semiconductor device 23e includes a switching element 1 and the control circuit 20e.

The semiconductor device 23e is a semiconductor device (semiconductor device for switching power supply) whose components are formed on the same semiconductor substrate. The semiconductor device 23e includes four terminals as external terminals, namely, a DRAIN terminal, a VCC terminal, a TR terminal, and a SOURCE terminal.

The control circuit 20e generates, based on the waveform of a voltage at the TR terminal, a control signal VGATE which is to be applied to the control terminal of the switching element 1, so as to control the switching operation of the switching element 1.

The control circuit 20e includes a regulator 7, a switching control circuit 5, the feedback control circuit 3e, the overvoltage detection circuit 6e, a secondary-side on-time signal generation circuit 14, and a transformer reset detection circuit 4.

The overvoltage detection circuit 6e changes the set value (overvoltage detection secondary-side on-time T2onlimV) for every control method (the PWM control method and the PFM control method). Note that the overvoltage detection circuit 6e may change the set value for each of the PWM control method, the PFM control method, and the secondary current on-duty control.

Hereinafter, the feedback control circuit 3e and the overvoltage detection circuit 6e are described in detail.

Figure 13A:
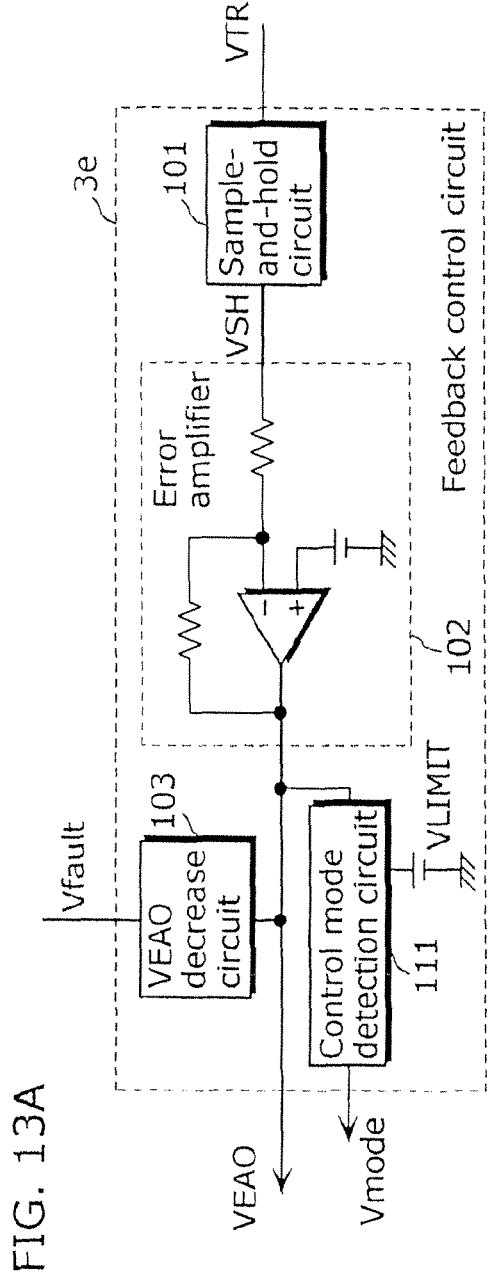
FIG. 13A is a block diagram showing an example of a configuration of a feedback control circuit according to Embodiment 6 of the present invention.

FIG. 13A is a diagram showing an example of a configuration of the feedback control circuit 3e included in the switching power supply device according to Embodiment 6 of the present invention.

The feedback control circuit 3e shown in FIG. 13A includes a control mode detection circuit 111 in addition to the constituent elements of the feedback control circuit 3 shown in FIG. 3A.

The control mode detection circuit 111 is connected to the error amplifier 102. The control mode detection circuit 111 compares the feedback signal VEAO with the element current reference level VLIMIT of the drain current control circuit 8, and generates a control mode signal Vmode indicating the result of the comparison.

Figure 13B:
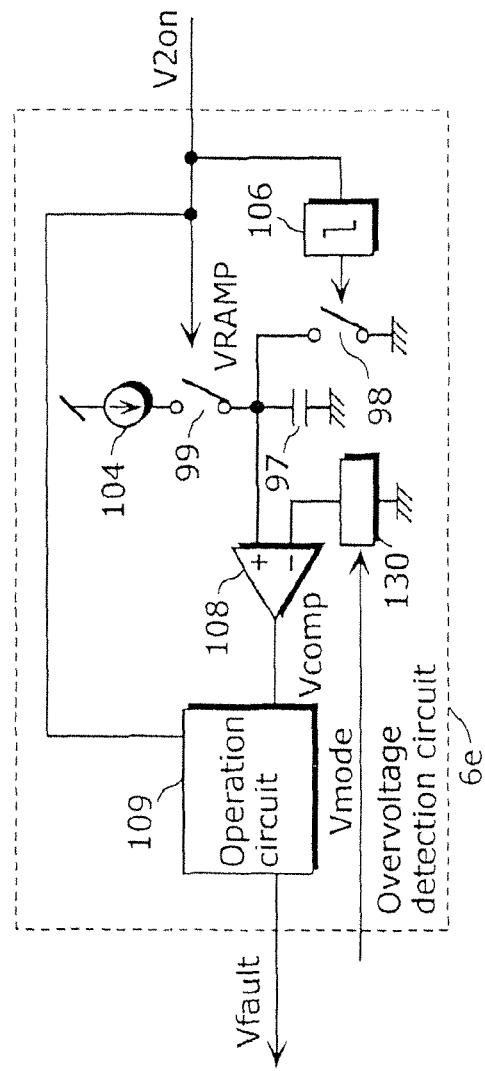
FIG. 13B is a block diagram showing an example of a configuration of an overvoltage detection circuit according to Embodiment 6 of the present invention.

FIG. 13B is a diagram showing an example of a configuration of the overvoltage detection circuit 6e included in the switching power supply device according to Embodiment 6 of the present invention.

The overvoltage detection circuit 6e shown in FIG. 13B includes a variable reference circuit 130 in addition to the constituent elements of the overvoltage detection circuit 6 shown in FIG. 3B.

The variable reference circuit 130 is connected to the control mode detection circuit 111 and the comparator 108, and generates a variable overvoltage detection level Vrefm that changes according to the control mode signal Vmode.

The comparator 108 is connected to the capacitor 97 and the variable reference circuit 130. The comparator 108 compares the variable overvoltage detection level Vrefm with the rate signal VRAMP, and generates a comparison signal Vcomp indicating the result of the comparison.

Figure 14:
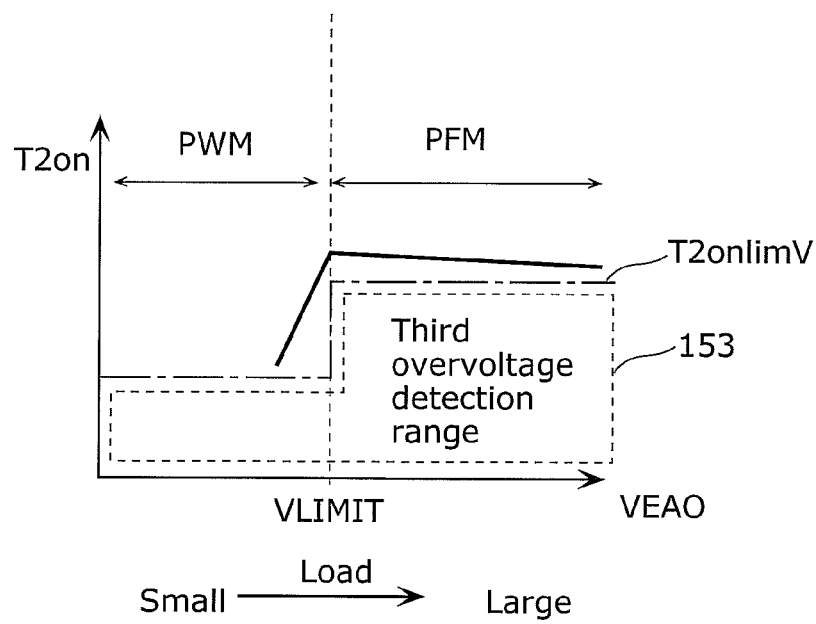
FIG. 14 is a diagram showing a relationship between a feedback signal VEAO and a secondary-side on-time T2on, which indicates an overvoltage detection range of a switching power supply device according to Embodiment 6 of the present invention.

FIG. 14 is a diagram showing a relationship between the feedback signal VEAO and the secondary-side on-time T2on of the switching power supply device 100e according to Embodiment 6 of the present invention.

The overvoltage detection secondary-side on-time T2onlimV is a threshold which is set according to the variable overvoltage detection level Vrefm. As shown in FIG. 14, the overvoltage detection secondary-side on-time T2onlimV changes discontinuously between the PFM control range and the PWM control range. A third overvoltage detection range 153 shown in FIG. 14 is a range in which the switching power supply device 100e according to Embodiment 6 detects overvoltage.

More specifically, the overvoltage detection circuit 6e uses a first value as the overvoltage detection secondary-side on-time T2onlimV when the PWM control method is used (when the output voltage Vo is higher than a first voltage level which is preset). On the other hand, the overvoltage detection circuit 6e uses, as the overvoltage detection secondary-side on-time T2onlimV, a second value higher than the first value when the PFM control method is used (when the output voltage Vo is lower than the first voltage level).

Figure 15:
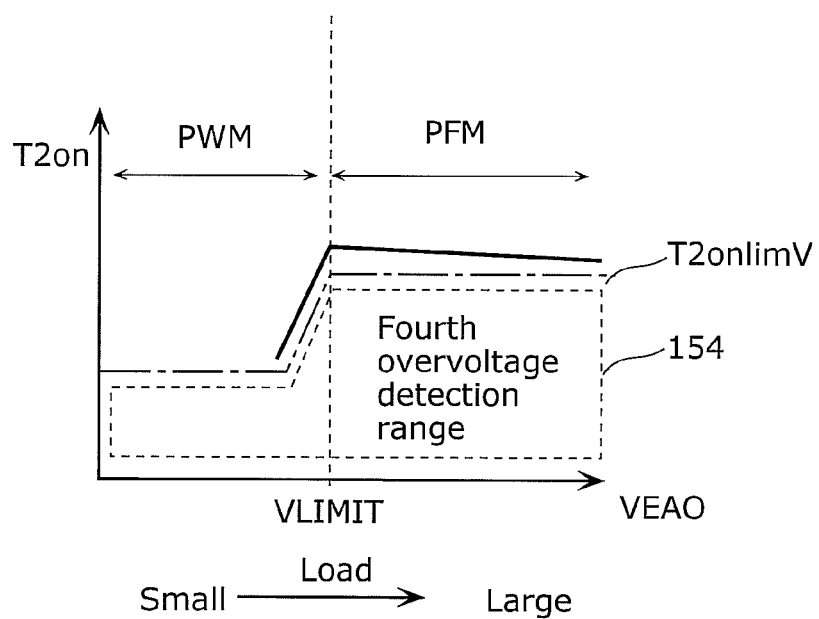
FIG. 15 is a diagram showing a relationship between a feedback signal VEAO and a secondary-side on-time T2on, which indicates an overvoltage detection range of a switching power supply device according to Embodiment 6 of the present invention.

FIG. 15 is a diagram showing another example of a relationship between the feedback signal VEAO and the secondary-side on-time T2on of the switching power supply device 100e according to Embodiment 6 of the present invention.

As shown in FIG. 15, in the PWM control range where the secondary-side on-time T2on varies according to the feedback signal VEAO, the overvoltage detection secondary-side on-time T2onlimV varies continuously according to the feedback signal VEAO while taking values lower than the secondary-side on-time during the normal operation. That is to say, the overvoltage detection circuit 6e increases the overvoltage detection secondary-side on-time T2onlimV when the switching element current peak IDP increases.

A fourth overvoltage detection range 154 shown in FIG. 15 is a range in which the switching power supply device 100e according to Embodiment 6 detects overvoltage in this case.

In such a manner, the switching power supply device 100e according to Embodiment 6 of the present invention is capable of suppressing an abnormal rise of the output voltage Vo that occurs when the TR terminal or a terminal of the auxiliary winding T3 is opened. This enables the switching power supply device 100e to prevent a break of the switching power supply device 100e and the load on the secondary side.

The switching power supply device 100e according to Embodiment 6 of the present invention includes the secondary current on-duty control circuit 13 and has the control function to make the secondary-side output current Io constant using the pulses of the voltage induced in the auxiliary winding T3. However, the switching power supply device 100e does not have to include the secondary current on-duty control circuit 13 as in the switching control circuit 5a according to Embodiment 2 of the present invention.

Although the switching power supply devices according to the embodiments of the present invention have been described above, the present invention is not limited to such embodiments.

For example, although the switching power supply devices described above are switching power supply devices that switch between the PFM control and the PWM control according to the load, the present invention may be applied to a switching power supply device which only performs either the PFM control or the PWM control.

The switching power supply devices described above are switching power supply devices that perform the feedback control by sampling, via the TR terminal and at a time point optimal for detecting the secondary-side output voltage, the pulse voltage Vbias induced in the auxiliary winding T3. However, the present invention may be applied to a switching power supply device which performs the feedback control by monitoring the auxiliary power voltage VCC generated by the auxiliary power generation circuit 125.

Moreover, although it has been described above that the VEAO decrease circuit 103 performs such control that the switching element current peak IDP and the switching frequency FOSC become minimum and the oscillation continues when the overvoltage detection signal Vfault is provided, the VEAO decrease circuit 103 may, for example, include a latch circuit to stop the oscillation when the overvoltage detection signal Vfault is provided.

Moreover, each processing unit included in the switching power supply devices according to Embodiments 1 to 5 is typically configured in the form of an LSI which is an integrated circuit. The LSIs may be implemented in a single chip individually, or in a single chip that includes some or all of them.

Furthermore, the means for circuit integration is not limited to an LSI, and implementation with a dedicated circuit or a general-purpose processor is also available. It is also acceptable to use a field programmable gate array (FPGA) that is programmable after the LSI has been manufactured, and a reconfigurable processor in which connections and settings of circuit cells within the LSI are reconfigurable.

Furthermore, some or all of the functions of the switching power supply devices according to Embodiments 1 to 5 of the present invention may be achieved through execution of a program by a processor such as a CPU.

The present invention may be realized as the above program or as a recording medium on which the above program is recorded.

Furthermore, it is apparent that such a program can be distributed via a transmission medium such as the Internet.

Moreover, at least some of the functions of the switching power supply devices according to Embodiments 1 to 5 and variations thereof may be combined.

Furthermore, all the numerical figures mentioned above are mere examples used for specifically describing the present invention, and thus the present invention is not limited to such numerical figures. In addition, the logic levels represented by "high" and "low" or the switching states expressed as "on" or "off" are also mere examples used for specifically describing the present invention, and it is also possible to obtain an equivalent result by using a different combination of the logic levels or the switching states exemplified above. Moreover, the configurations of the logic circuits illustrated above are also mere examples used for specifically describing the present invention, and it is also possible to achieve an equivalent input/output relationship using a logic circuit having a different configuration. The n-type, the p-type, and the like of transistors and so on are mere examples used for specifically describing the present invention, and it is also possible to obtain an equivalent result by reversing these types. In addition, the relationships of the connections between the constituent elements are also mere examples used for specifically describing the present invention, and the relationships of connections that achieve the functions as described in the present invention are not limited to these.

In addition, the present invention also includes various variations achieved through modifications of the embodiments of the present invention that a person skilled in the art can conceive without departing from the scope of the present invention.

Industrial Applicability

The present invention is applicable to switching power supply devices and various electronic devices equipped with a switching power supply device, and is useful particularly for electronic devices that require overvoltage protection for preventing application of an overvoltage on various loads (including devices and the like) connected to a switching power supply device.

What is claimed is:

1. A switching power supply device comprising:
   a power transformer including a primary winding, a secondary winding, and an auxiliary winding;
   a switching element which is connected to said primary winding and performs a switching operation to supply and stop supplying a first direct-current voltage to said primary winding;
   an output voltage generation circuit which converts, into a second direct-current voltage, an alternating-current voltage induced in said secondary winding through the switching operation of said switching element, and supplies the second direct-current voltage to a load;
   a transformer reset detection circuit which monitors a voltage signal of said auxiliary winding and generates a transformer reset signal according to a decrease in the voltage signal;
   a secondary-side on-time signal generation circuit which generates a secondary-side on-time signal indicating a secondary-side on-time that is a time period from when said switching element is turned off to when the transformer reset signal is generated;
   a feedback control circuit which generates a feedback signal corresponding to a voltage level of the second direct-current voltage;
   a switching control circuit which controls the switching operation of said switching element according to the feedback signal so that the second direct-current voltage falls within a normal operation specified range; and
   an overvoltage detection circuit which generates an overvoltage detection signal when the secondary-side on-time indicated by the secondary-side on-time signal becomes smaller than a set value,
   wherein the set value is smaller than the secondary-side on-time resulting when the second direct-current voltage is controlled to be within the normal operation specified range, and
   said switching control circuit controls the switching operation of said switching element so that the second direct-current voltage becomes equal to or below an overvoltage specified value when said overvoltage detection circuit generates the overvoltage detection signal.

2. The switching power supply device according to claim 1, wherein the set value is smaller than a minimum secondary-side on-time resulting when the second direct-current voltage is controlled to be within the normal operation specified range.

3. The switching power supply device according to claim 1, wherein the set value is a constant value.

4. The switching power supply device according to claim 1, wherein said feedback control circuit is connected to said auxiliary winding and generates the feedback signal according to a voltage level of said auxiliary winding,
   said feedback control circuit includes a heavy load detection circuit which generates a heavy load detection signal when the voltage level of said auxiliary winding becomes lower than a heavy load detection voltage which is preset,
   said overvoltage detection circuit generates the overvoltage detection signal when said heavy load detection circuit generates the heavy load detection signal and the secondary-side on-time indicated by the secondary-side on-time signal becomes smaller than the set value, and
   the set value is smaller than a minimum secondary-side on-time resulting when the voltage level of said auxiliary winding is lower than the heavy load detection voltage.

5. The switching power supply device according to claim 1,
wherein said feedback control circuit is connected to said auxiliary winding and generates the feedback signal according to a voltage level of said auxiliary winding,
said switching control circuit controls the switching operation of said switching element according to an amount of the load using two or more control methods so as to adjust power supplied to the load, said switching control circuit switching among the two or more control methods according to the feedback signal, and
said overvoltage detection circuit changes the set value for each of the two or more control methods.

6. The switching power supply device according to claim 5,
wherein the two or more control methods include:
a pulse width modulation (PWM) control method of controlling, according to the feedback signal, a peak value of a current flowing through said switching element so that the second direct-current voltage falls within the normal operation specified range; and
a pulse frequency modulation (PFM) control method of controlling a switching frequency of said switching element according to the feedback signal so that the second direct-current voltage falls within the normal operation specified range,
said switching control circuit uses the PWM control method when the second direct-current voltage is higher than a first voltage level which is preset, and uses the PFM control method when the second direct-current voltage is lower than the first voltage level, and
said overvoltage detection circuit uses a first value as the set value when the second direct-current voltage is higher than the first voltage level, and uses a second value as the set value when the second direct-current voltage is lower than the first voltage level, the second value being higher than the first value.

7. The switching power supply device according to claim 1,
wherein said feedback control circuit is connected to said auxiliary winding and generates the feedback signal according to a voltage level of said auxiliary winding,
said switching control circuit controls, according to the feedback signal, a peak value of a current flowing through said switching element so that the second direct-current voltage falls within the normal operation specified range, and
said overvoltage detection circuit increases the set value when the peak value increases.

8. The switching power supply device according to claim 1,
wherein said feedback control circuit decreases a switching frequency of said switching element when said overvoltage detection circuit generates the overvoltage detection signal.

9. The switching power supply device according to claim 1,
wherein, when said overvoltage detection circuit generates the overvoltage detection signal, said feedback control circuit decreases a peak value of a current flowing through said switching element.

10. The switching power supply device according to claim 1,
wherein, when said overvoltage detection circuit generates the overvoltage detection signal, said feedback control circuit varies the feedback signal in value in a direction in which the feedback signal varies in value when the voltage level of the second direct-current voltage increases, and
when said overvoltage detection circuit generates the overvoltage detection signal, said switching control circuit controls the switching operation of said switching element according to the varied feedback signal so that the second direct-current voltage becomes equal to or below the overvoltage specified value.

\* \* \* \* \*